(12) United States Patent
Lee et al.

(10) Patent No.: US 11,376,469 B2
(45) Date of Patent: Jul. 5, 2022

(54) ELECTRONIC DEVICE PROVIDING WORKOUT INFORMATION ACCORDING TO WORKOUT ENVIRONMENT AND METHOD OF OPERATING THE SAME

(71) Applicant: Samsung Electronics Co., Ltd., Gyeonggi-do (KR)

(72) Inventors: Wonhee Lee, Gyeonggi-do (KR); Jaehyuk Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 207 days.

(21) Appl. No.: 16/887,673

(22) Filed: May 29, 2020

(65) Prior Publication Data

US 2020/0376337 A1 Dec. 3, 2020

(30) Foreign Application Priority Data

May 30, 2019 (KR) .................. 10-2019-0063865

(51) Int. Cl.
*A63B 71/06* (2006.01)
*A63B 24/00* (2006.01)
*G06F 3/01* (2006.01)
*G06V 40/20* (2022.01)

(52) U.S. Cl.
CPC ...... *A63B 24/0062* (2013.01); *A63B 71/0622* (2013.01); *G06F 3/011* (2013.01); *G06V 40/23* (2022.01); *A63B 2024/0071* (2013.01); *A63B 2071/0666* (2013.01); *A63B 2220/12* (2013.01); *A63B 2220/13* (2013.01); *A63B 2220/17* (2013.01); *A63B 2220/56* (2013.01); *A63B 2220/803* (2013.01); *A63B 2220/836* (2013.01); *A63B 2244/20* (2013.01)

(58) Field of Classification Search
CPC ............ A63B 24/0062; A63B 71/0622; A63B 2220/12; A63B 2220/13; A63B 2220/17; A63B 2220/56; A63B 2220/803; A63B 2220/836; A63B 2244/20; A63B 71/06; G06F 3/011; G06K 9/00342
See application file for complete search history.

(56) References Cited

U.S. PATENT DOCUMENTS 10,327,674 B2 * 6/2019 Hong ................. A61B 5/02433
10,908,295 B2 * 2/2021 Cho ....................... G01S 19/258
10,918,907 B2 * 2/2021 Niehaus ............. G09B 19/0038
(Continued)

FOREIGN PATENT DOCUMENTS

CN 207609211 7/2018
EP 3 459 271 3/2019
(Continued)

OTHER PUBLICATIONS

International Search Report dated Sep. 4, 2020 issued in counterpart application No. PCT/KR2020/007013, 7 pages.
(Continued)

*Primary Examiner* — Olga V Merkoulova
(74) *Attorney, Agent, or Firm* — The Farrell Law Firm, P.C.

(57) ABSTRACT

Disclosed is an electronic device capable of automatically identifying a workout environment, such as a swimming pool environment or outdoor environment, based on position-associated information of the electronic device and providing workout information per the workout environment.

20 Claims, 20 Drawing Sheets

(56) References Cited

U.S. PATENT DOCUMENTS

| | | | |
|---|---|---|---|
| 11,103,749 B2* | 8/2021 | Mermel | A63B 24/0006 |
| 2010/0009811 A1* | 1/2010 | Lee | A63B 24/0084 |
| | | | 482/8 |
| 2014/0149066 A1* | 5/2014 | Holopainen | A61B 5/1126 |
| | | | 702/139 |
| 2014/0176346 A1* | 6/2014 | Brumback | G06F 3/01 |
| | | | 340/870.16 |
| 2014/0358473 A1* | 12/2014 | Goel | A61B 5/1118 |
| | | | 702/141 |
| 2015/0106025 A1 | 4/2015 | Keller et al. | |
| 2015/0230735 A1 | 8/2015 | Venkatraman et al. | |
| 2016/0269868 A1* | 9/2016 | Su | A61B 5/1112 |
| 2017/0192101 A1* | 7/2017 | Cho | G01S 19/28 |
| 2018/0028863 A1* | 2/2018 | Matsuda | G01C 21/14 |
| 2018/0043210 A1* | 2/2018 | Niehaus | A61B 5/11 |
| 2018/0055376 A1* | 3/2018 | Yuen | G01P 15/003 |
| 2018/0056123 A1* | 3/2018 | Narasimha Rao | A63B 24/0006 |
| 2018/0056128 A1* | 3/2018 | Narasimha Rao | G01C 22/00 |
| 2018/0160943 A1* | 6/2018 | Fyfe | A61B 5/1112 |
| 2019/0125219 A1* | 5/2019 | Sharpe | A63B 69/12 |

FOREIGN PATENT DOCUMENTS

| | | |
|---|---|---|
| JP | 2018-015187 | 2/2018 |
| KR | 1020150029453 | 3/2015 |
| KR | 1020150135072 | 10/2015 |
| WO | WO 2015/164944 | 11/2015 |
| WO | WO 2017/201298 | 11/2017 |

OTHER PUBLICATIONS

European Search Report dated Apr. 11, 2022 issued in counterpart application No. 20815430.2-1224, 8 pages.

* cited by examiner

ELECTRONIC DEVICE PROVIDING WORKOUT INFORMATION ACCORDING TO WORKOUT ENVIRONMENT AND METHOD OF OPERATING THE SAME

CROSS-REFERENCE TO RELATED APPLICATION(S)

This application is based on and claims priority under 35 U.S.C. § 119 to Korean Patent Application No. 10-2019-0063865, filed on May 30, 2019, in the Korean Intellectual Property Office, the disclosure of which is incorporated herein by reference in its entirety.

BACKGROUND

1. Field

The disclosure relates generally to an electronic device, and more particularly, to an electronic device providing workout information according to a workout environment and a method of operating the same.

2. Description of Related Art

Wearable electronic devices, such as a three-axis accelerometer, a gyro or other type of motion sensor, and a global positioning system (GPS) module, may be worn on user body portions and are able to sense information according to user motion. The wearable electronic device may provide a user's exercise or workout information based on the user's motion information identified as the user moves and/or position information identified by the GPS module.

Waterproof wearable electronic devices allow users to swim while wearing the devices on a body part, such as their wrist. Such a wearable electronic device may provide swimming workout information based on sensed information. The wearable electronic device may provide the user's swimming-related information, such as distance, lap time, or swimming style. The lap time information may be of importance when the user swims in a pool. The swim distance may be critical, such as during outdoor swimming.

As used herein, pool or swimming pool may refer to a space with a uniform standard size, in which the user may swim, and outdoor environment may refer to an open space, such as a river, sea, or lake. Swimming in the outdoor environment may be free from spatial limitations. A wearable electronic device may provide different types of data in the pool environment and outdoor environment.

Typically, upon receiving an input to indicate start of a swim from the user, the electronic device may gather, process, manage, or provide data for providing workout information. The electronic device needs to receive an input for designating a workout environment from the user in order to provide data appropriate for the pool environment and outdoor environment. The user's explicit designation is needed to separately provide information corresponding to the pool environment and the outdoor environment. Conventional electronic devices lack the capability of auto-determining whether a swim starts or differentiating between the pool environment and the outdoor environment.

Thus, there is a need in the art for a method and apparatus that distinguishes between such environments and automatically discerns a start time of the swim.

SUMMARY

Aspects of the disclosure are to address at least the above-mentioned problems and/or disadvantages and to provide at least the advantages described below.

Accordingly, an aspect of the disclosure is to provide an electronic device capable of automatically identifying the workout environment based on position-associated information and providing workout information per workout environment, and a method of operating the electronic device.

Another aspect of the disclosure is to provide an electronic device capable of automatically identifying whether a swim starts and a method of operating the electronic device.

In accordance with an aspect of the disclosure, an electronic device includes a display, a position measurement module configured to receive a satellite signal from a satellite and output position information about the electronic device, at least one sensor configured to sense at least one of a motion of the electronic device and a posture of the electronic device, at least one processor operatively connected with the display, the position measurement module, and the at least one sensor, and a memory operatively connected with the at least one processor, wherein the memory stores instructions configured to, when executed, enable the at least one processor to, based on the position information about the electronic device not being obtained by the position measurement module, identify, a workout environment of a user of the electronic device as a pool environment, and control the display to display a first screen including at least part of information corresponding to the pool environment based on sensing data obtained via the at least one sensor, obtain the position information about the electronic device by the position measurement module, based on the obtained position information about the electronic device corresponding to a recursive pattern, identify the workout environment as the pool environment, and control the display to display the first screen, based on the obtained position information about the electronic device not corresponding to the recursive pattern, identify the workout environment as an outdoor environment, and control the display to display a second screen including at least part of information corresponding to the outdoor environment based on the sensing data and the obtained position information about the electronic device.

In accordance with another aspect of the disclosure, a method of operating an electronic device includes, based on position information about the electronic device not being obtained by a position measurement module of the electronic device, identifying a workout environment of a user of the electronic device as a pool environment, and providing, through a display of the electronic device, at least part of information corresponding to the pool environment based on sensing data obtained via at least one sensor of the electronic device, obtaining the position information about the electronic device by the position measurement module, based on the obtained position information about the electronic device corresponding to a recursive pattern, identifying the workout environment as the pool environment, and providing, through the display, at least part of the information corresponding to the pool environment, and based on the obtained position information about the electronic device not corresponding to the recursive pattern, identifying the workout environment as an outdoor environment, and providing, through the display, at least part of information corresponding to the outdoor environment based on the sensing data and the obtained position information about the electronic device.

BRIEF DESCRIPTION OF THE DRAWINGS

The above and other aspects, features, and advantages of certain embodiments of the disclosure will be more apparent from the following description taken in conjunction with the accompanying drawings, in which.

The same or similar reference denotations may be used to refer to the same or similar elements throughout the specification and the drawings.

DETAILED DESCRIPTION

Figure 1:
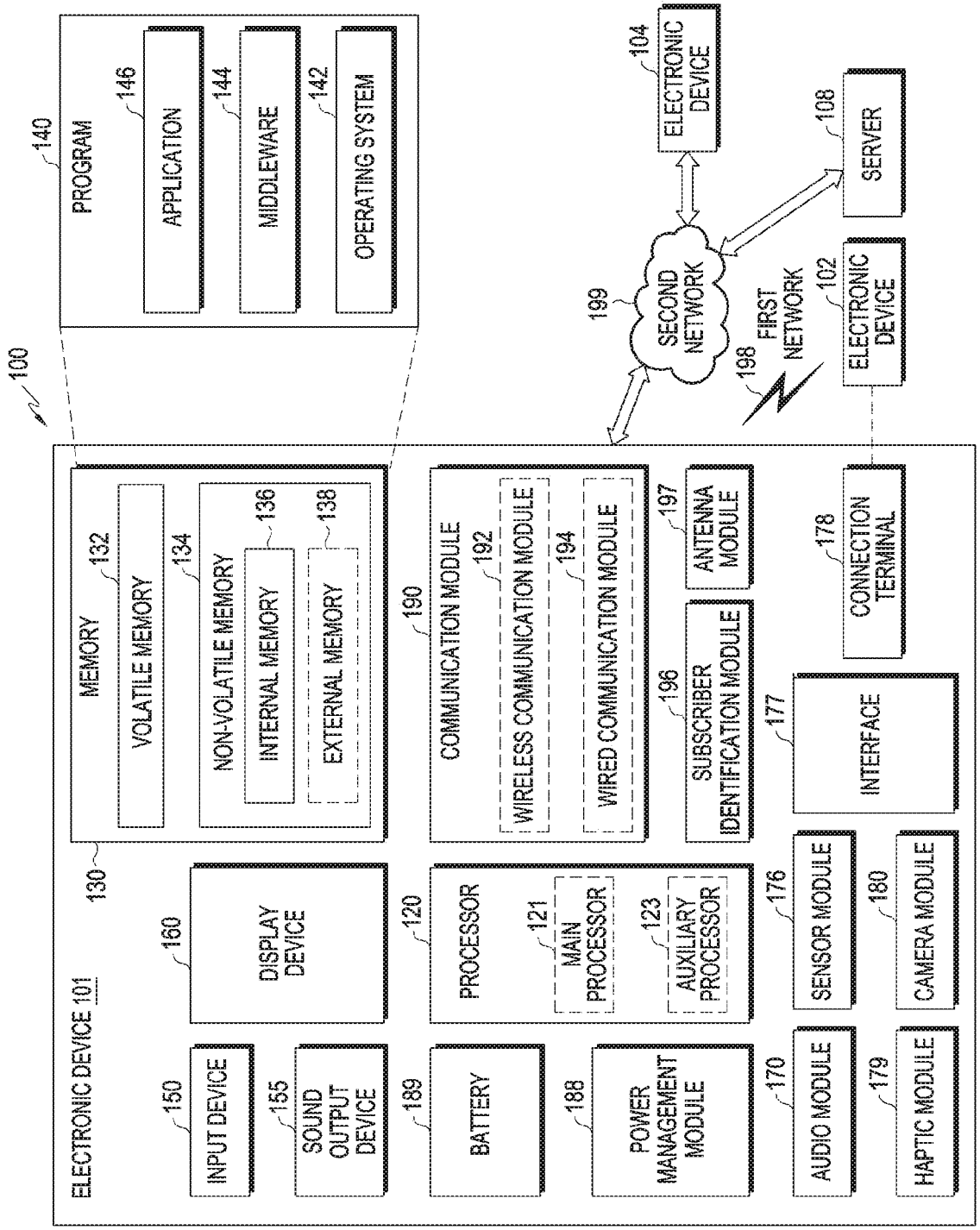
FIG. 1 illustrates an electronic device in a network environment according to an embodiment.

Embodiments of the disclosure will be described with reference to accompanying drawings. Accordingly, those of ordinary skill in the art will recognize that modifications, equivalents, and/or alternatives on the embodiments described herein can be made without departing from the scope and spirit of the disclosure. Descriptions of well-known functions and/or configurations will be omitted for the sake of clarity and conciseness.

The electronic device as described herein may be one of various types of electronic devices, including a portable communication device (e.g., a smart phone), a computer device, a portable multimedia device, a portable medical device, a camera, a wearable device, or a home appliance. However, the electronic device is not limited to the above-listed types.

It should be appreciated that embodiments and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another and do not limit the components in importance or order. It is to be understood that if an element, such as a first element, is referred to, with or without the term "operatively" or "communicatively", as "coupled with," "coupled to," "connected with," or "connected to" another element, such as a second element, this indicates that the first element may be coupled with the second element directly (e.g., wiredly), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
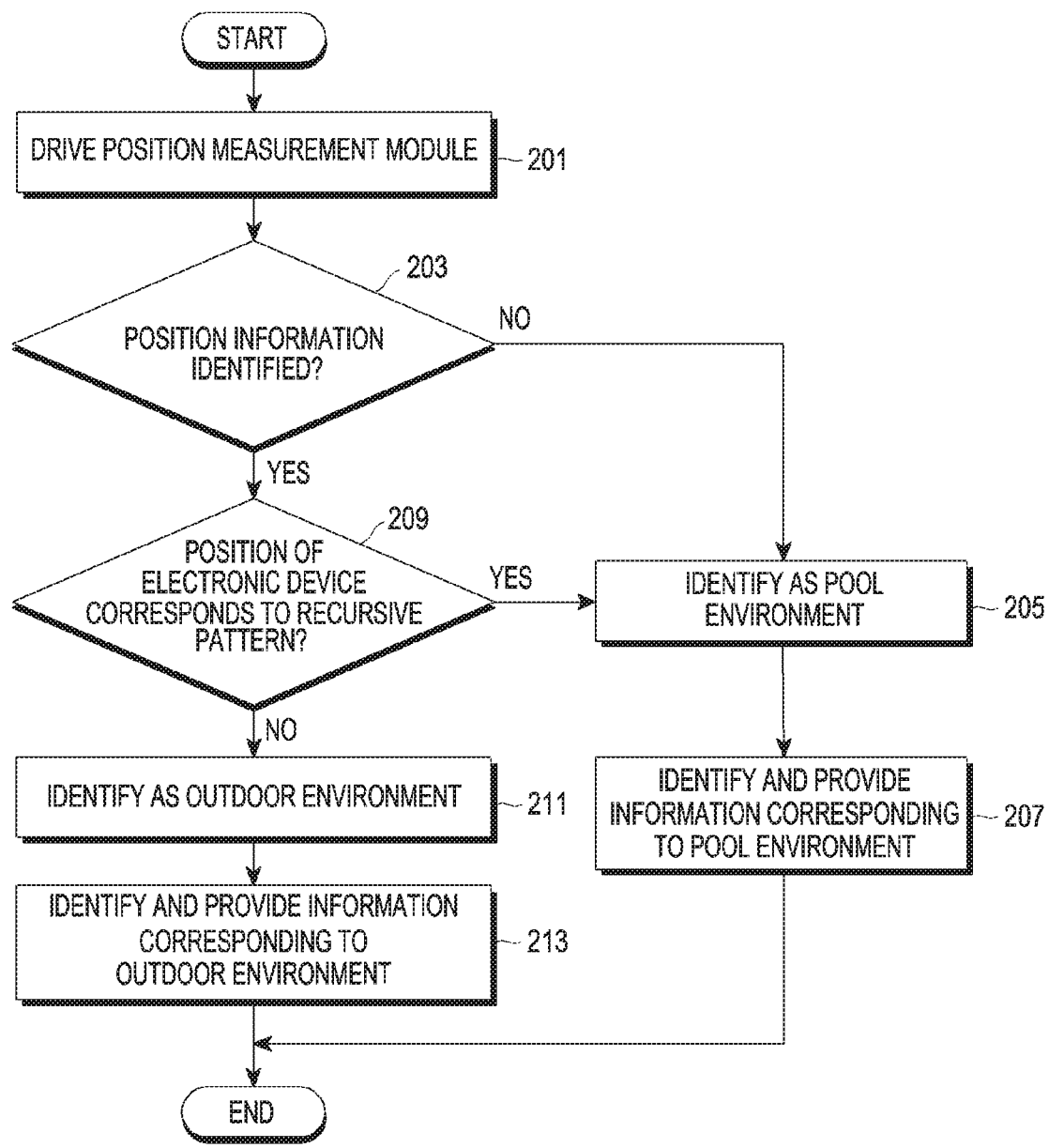
FIG. 2 illustrates a method for operating an electronic device according to an embodiment.

FIG. 2 illustrates a method for operating an electronic device according to an embodiment. The operations of FIG. 2 are not limited in order, and other operation(s) may intervene between two adjacent operations. At least some of the operations of FIG. 2 may be omitted, and the description herein may apply likewise to all of the flowcharts. In the disclosure, when the electronic device 101 performs a specific operation, the processor 120 of the electronic device 101 may perform the specific operation, or the processor 120 may control other hardware to perform the specific operation. In the disclosure, when the electronic device 101 performs a specific operation, instructions stored in the memory 130 may be executed to enable the processor 120 or other hardware to perform the specific operation, and instructions that trigger the specific operation may be stored in the memory 130.

Referring to FIG. 2, according to various embodiments, an electronic device 101 may drive a position measurement module in step 201. The position measurement module may detect a satellite signal from a satellite and output information indicating the position from the detected satellite signal. The position measurement module may be implemented as a GNSS communication module, and schemes of the GNSS communication module may include, but are not limited in type to, GPS, global navigation satellite system (GLONASS), GALILEO, Beidou, quasi-zenith satellite system (QZSS), and Indian regional navigation satellite system (IRNSS) schemes. The position measurement module may detect satellite signals individually from a plurality of satellites and identify the position information about the electronic device 101 based on the plurality of satellite signals. The position measurement module may transfer the position information to the processor 120 of the electronic device 101. If a designated number (e.g., four) of satellite signals is not detected, the position measurement module may fail to identify the position information. The electronic device 101 may keep the position measurement module on or, depending on implementation, the electronic device 101 may drive the position measurement module periodically only during a designated period. Alternatively, if a designated condition is met, the electronic device 101 may keep the position measurement module running or drive the position measurement module for a designated period, such as based on meeting a condition for determining whether a workout starts. However, the driving of the position measurement module is not limited thereto.

According to various embodiments, in step 203, the electronic device 101 may identify whether the position information about the electronic device 101 is identified. The processor 120 may identify whether position information is received from the position measurement module. As set forth above, the position measurement module may identify and output the position information about the electronic device 101 based on satellite signals. Upon failure in measuring position information, the position measurement module outputs no position information or may output information indicating the failure in measurement of position information. For example, the electronic device 101 may fail to measure position information if positioned indoors. Specifically, at least some of the plurality of satellite signals may not be detected by the position measurement module indoors, in which case the position measurement module may fail to measure position information.

According to various embodiments, if position information is identified to have failed in identification (no in step 203), the electronic device 101 may identify that the workout environment is a pool environment in step 205. As set forth above, detection of position information indoors has a high chance of failure. For example, if the user enters an indoor pool with the electronic device 101 on, the electronic device 101 may fail to identify position information. The electronic device 101 may identify that the workout environment is a pool environment in response to failure in detection of position information. If the workout environment is identified to be a pool environment, the electronic device 101 may identify and provide information corresponding to the pool environment in step 207. The electronic device 101 may activate each sensor for measuring the type of at least one piece of data that needs to be identified corresponding to the pool environment. The electronic device 10 may keep sensors which have been already activated active and may deactivate other sensors than those that need to be activated corresponding to the pool environment.

According to various embodiments, the electronic device 101 may activate all of the sensors to obtain sensing data and may be configured to process and provide sensing data corresponding to the pool environment. The electronic device 101 may provide information (e.g., workout information) corresponding to the pool environment, via an output device of the electronic device 101 (e.g., a display, microphone, or haptic module), or may control the communication module 190 to provide the workout information to an external electronic device. The external electronic device (e.g., a contact lens-type electronic device, a swimming goggles-type electronic device, or an earset-type electronic device) may output at least part of the received workout information.

According to various embodiments, if the position information is identified to have been identified (yes in step 203), the electronic device 101 may identify whether the position of the electronic device 101 corresponds to a recursive pattern in step 209. When the user swims in a pool with the electronic device 101 on, the electronic device 101 may receive satellite signals and identify the position information. In this case, however, the electronic device 101 needs to provide information corresponding to the pool environment. The electronic device 101, upon identifying the position information, may track the position information during a designated period set to a time required for an ordinary user to swim at least a predetermined number (e.g., two) of back-and-forth laps in the pool, and the designated period may be a default value or a value adjusted based on the user's prior record.

The recursive pattern may be a pattern indicating that the position information is varied only within a predetermined range or a pattern in which a proportion of a position within a predetermined range is a threshold proportion or more. The recursive pattern may be a pattern in which the distances between a reference point and positions are a threshold distance or less or in which a ratio of the number of distances exceeding the threshold distance to the total number of distances is a threshold ratio or less. The recursive pattern may be a pattern indicating that the progress direction periodically varies. Based on position information over time, the electronic device 101 may identify information about the progress direction and may identify whether the progress direction periodically varies.

As will be appreciated by one of ordinary skill in the art, any pattern in which position information moves within a predetermined range may be taken as the recursive pattern. Upon identifying that it corresponds to the recursive pattern (yes in step 209), the electronic device 100 may identify that the workout environment is the pool environment. According to various embodiments, upon identifying the position information, the electronic device 101 may be configured to identify that the workout environment is the outdoor environment.

Figure 3A:
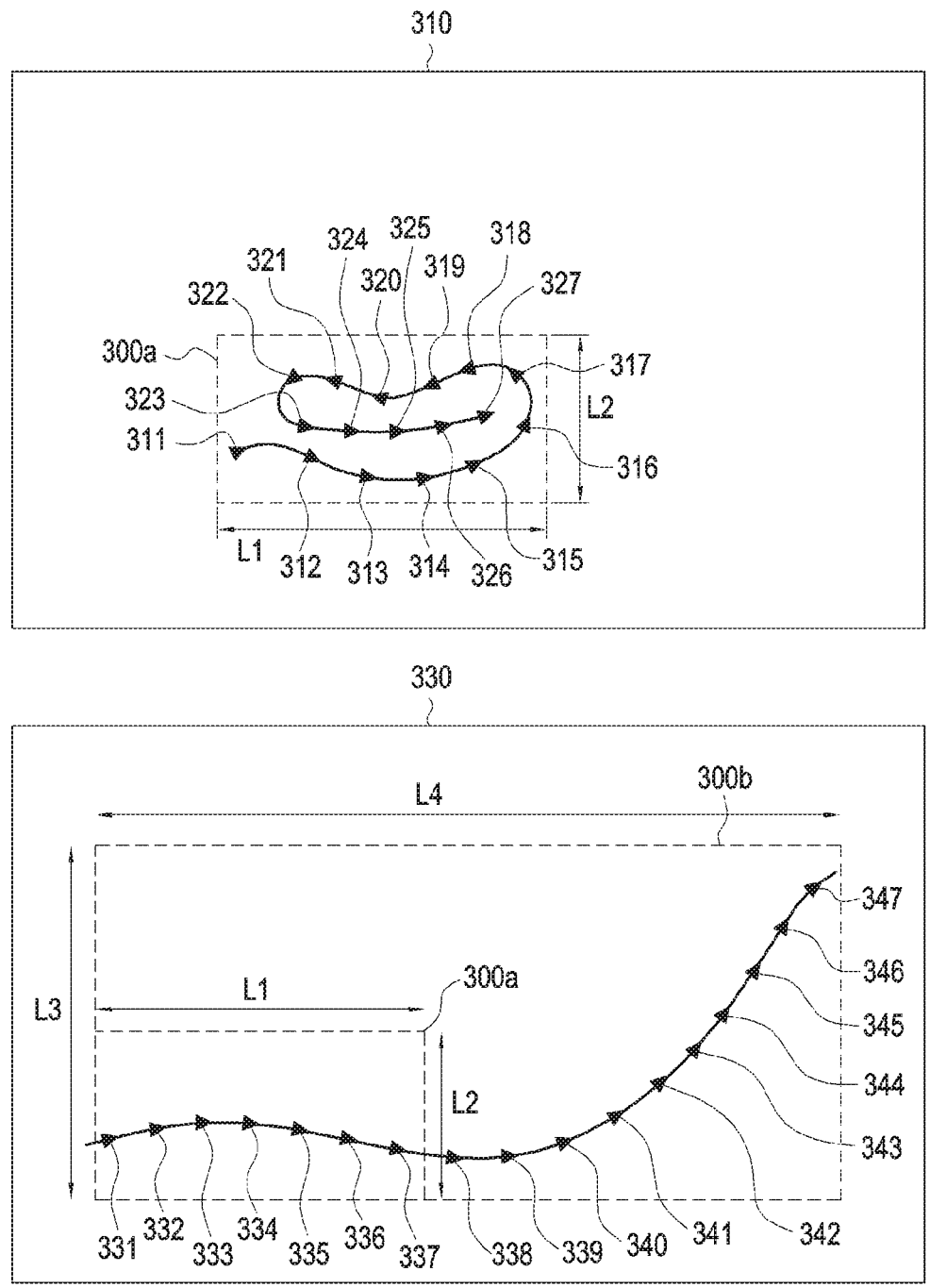
FIG. 3A illustrates position information in a pool environment and position information in an outdoor environment according to an embodiment.

FIG. 3A illustrates position information in a pool environment and position information in an outdoor environment according to an embodiment.

For example, the electronic device 101 may identify a position information record 310 as shown in FIG. 3A during a designated period. Although it is illustrated that the position information record 310 is composed of indicators 311 to 327 indicating positions on the map, this is solely for ease of description, and the position information record 310 may be constituted with GPS coordinates during the designated period. The indicators 311 to 327 in the position information record 310 are visual representations of GPS coordinates identified during a preset period, and may be greater or fewer in number than those shown in FIG. 3A. The electronic device 101 may identify that the indicators 311 to 327 are included in a designated range 300a and, based thereupon, may identify that the position information corresponding to the indicators 311 to 327 is a recursive pattern. The length of each edge L1 and L2 of the designated range 300a may be designated corresponding to the size of a regular swimming pool, but designation is not limited to a specific manner.

Although FIG. 3A illustrates the indicators 311 to 327 ideally corresponding to the user's actual positions, some indicators may be off the designated range 300a due to measurement errors in the position measurement module. The electronic device 101 may identify that a ratio of the number of indicators included in the designated range 300a to the total number of all the indicators is greater than or equal to a threshold ratio and, based thereupon, the electronic device 101 may identify that the position information corresponds to the recursive pattern.

As another example, the electronic device 101 may identify a position information record 310 as shown in FIG. 3A during a designated period. The electronic device 101 may identify the moving direction of the electronic device 101 based on variations in position information. Based upon detecting that the moving direction changes to the opposite direction, the electronic device 101 may identify that the workout environment is the pool environment. The electronic device 101 may identify that the workout environment is the pool environment based on whether the changes in moving direction periodically arise or similarity between the times required for the moving direction to change.

Returning to the method of FIG. 2, upon identifying that the position of the electronic device 101 does not correspond to the recursive pattern (no in step 209), the electronic device 101 may identify that the workout environment is the outdoor environment in step 211. In step 213, the electronic device 101 may identify and provide information corresponding to the outdoor environment. The workout information that the electronic device 101 identifies and provides in the outdoor environment may at least partially differ from the workout information that the electronic device 101 identifies and provides in the pool environment. At least one sensor that the electronic device 101 has activated to sense data in the outdoor environment may at least partially differ from at least one sensor that the electronic device 101 has activated to sense data in the pool environment.

Figure 3B:
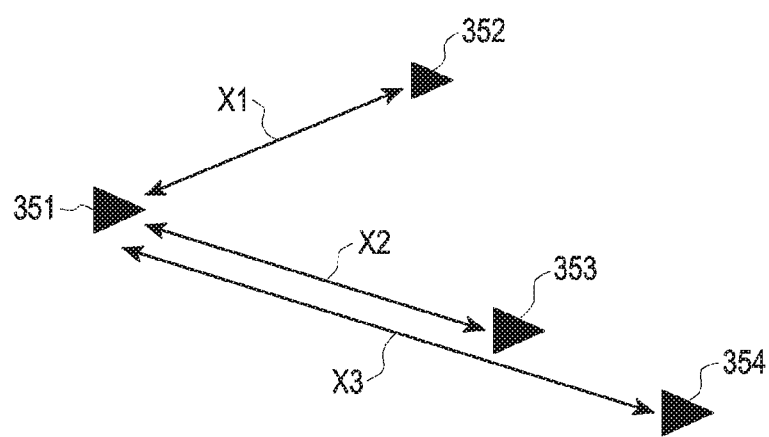
FIG. 3B illustrates a process of identifying whether a pattern is a recursive pattern based on the distance between indicators according to an embodiment.

For example, the electronic device 101 may identify a position information record 330 as shown in FIG. 3A during a designated period. Although it is illustrated that the position information record 330 is composed of indicators 331 to 347 indicating positions on the map, this is solely for ease of description, and the position information record 330 may be constituted with GPS coordinates during the designated period. The electronic device 101 may identify that at least some of the indicators 331 to 347 are included within the designated range 300a, and the others are not included within the designated range 300a. Based on the identification that the others are not included within the designated range 300a, the electronic device 101 may identify that the position information about the electronic device 101 is not the recursive pattern. Based on identifying that the ratio of the number of indicators 338 to 347 not included within the designated range 300a to the number of all of the indicators 331 to 347 is greater than or equal to the threshold ratio, the electronic device 101 may identify that the position information about the electronic device 101 is not the recursive pattern. The electronic device 101 may also set an area 300b including all of the indicators 331 to 347 and, based on the lengths L3 and L4 of the edges of the area 300b being longer than the threshold edge lengths (e.g., L1 and L2), the electronic device 101 may identify that the position information about the electronic device 101 is not the recursive pattern. Based on failure in detecting that the moving direction changes to the opposite direction, the electronic device 101 may identify that the position information is not the recursive pattern. FIG. 3B illustrates a process of identifying whether a pattern is a recursive pattern based on the distance between indicators according to an embodiment. The electronic device 101 may obtain position information over time using, e.g., the position measurement module. FIG. 3B illustrates indicators 351, 352, 353, and 354 indicating the position information. The electronic device 101 may identify the distances X1, X2, and X3 between a reference point (e.g., the indicator 351) and the indicators 352, 353, and 354 and, if at least a threshold distance is among the distances X1, X2, and X3, the electronic device 101 may identify that the workout environment is the outdoor environment. The reference point may be set to any one of the indicators 351, 352, 353, and 354. However, this is merely an example. For example, the reference point may be set to a mean of the positions of the indicators 351, 352, 353, and 354. Alternatively, the electronic device 101 may identify the workout environment based on whether the ratio of the number of distances greater than or equal to the threshold distance to the number of all of the distances X1, X2, and X3 is a threshold ratio.

As set forth above in the method of FIG. 2, if the position information has been identified (yes in step 203), the electronic device 101 may identify the workout environment based on whether the position corresponds to the recursive pattern. Thus, a time may be required to identify the workout environment. Until before the workout environment is definitely confirmed, the electronic device 101 may sense all data corresponding to both the workout environments and provide and/or store all of the workout information corresponding to both the workout environments. The electronic device 101 may also sense data corresponding to any one of both the workout environments and provide and/or store workout information corresponding to the environment. The number of the workout environments is merely an example, and thus, is not limited to two.

Figure 4:
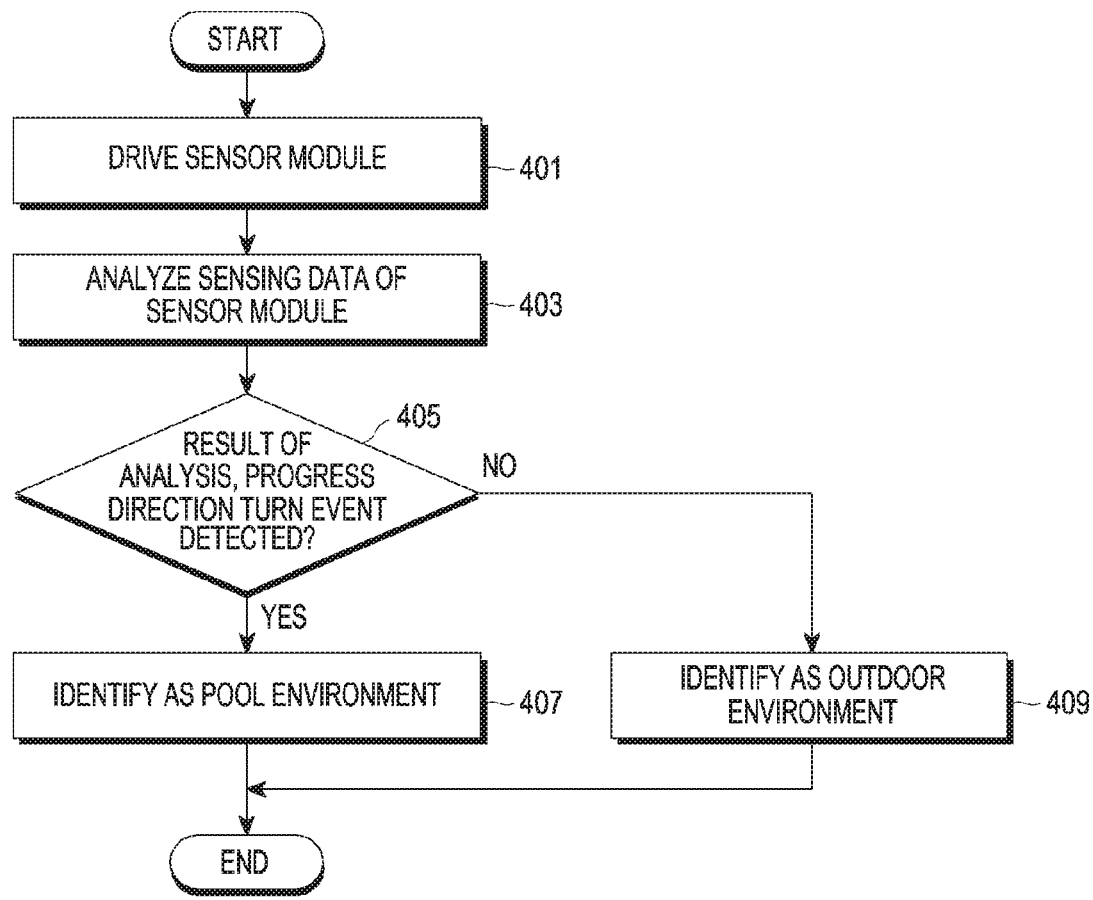
FIG. 4 illustrates a method for operating an electronic device according to an embodiment.

According to various embodiments, the electronic device 101 may identify the workout environment further using additional information other than the position information from the position measurement module. For example, the electronic device 101 may identify the workout environment based on detection of a direction turn event by a motion sensor, the periodicity of the number of strokes between direction turn events, or the periodicity of time required between direction turn events. FIG. 4 illustrates a method for operating an electronic device according to an embodiment, and is described in greater detail with reference to FIG. 5 which illustrates a direction turn event according to an embodiment.

According to various embodiments, in FIG. 4, the electronic device 101 may drive a sensor module 176 in step 401. The sensor module 176, described above, may output sensing data associated with the motion of the electronic device 101. Upon identifying the start of a swim, the electronic device 101 may drive the sensor module 176. However, the driving of the sensor module 176 is not limited to a specific time. At least part of the sensor module 176 may be previously activated regardless of whether the swim starts. In step 403, the electronic device 101 may analyze sensing data from the sensor module 176. In step 405, the electronic device 101 may identify whether a progress direction turn event is detected as a result of analysis. The direction turn event may indicate that the sensing data corresponds to at least one of a value, feature, or waveform corresponding to the user's turn of the exercise direction.

Figure 5:
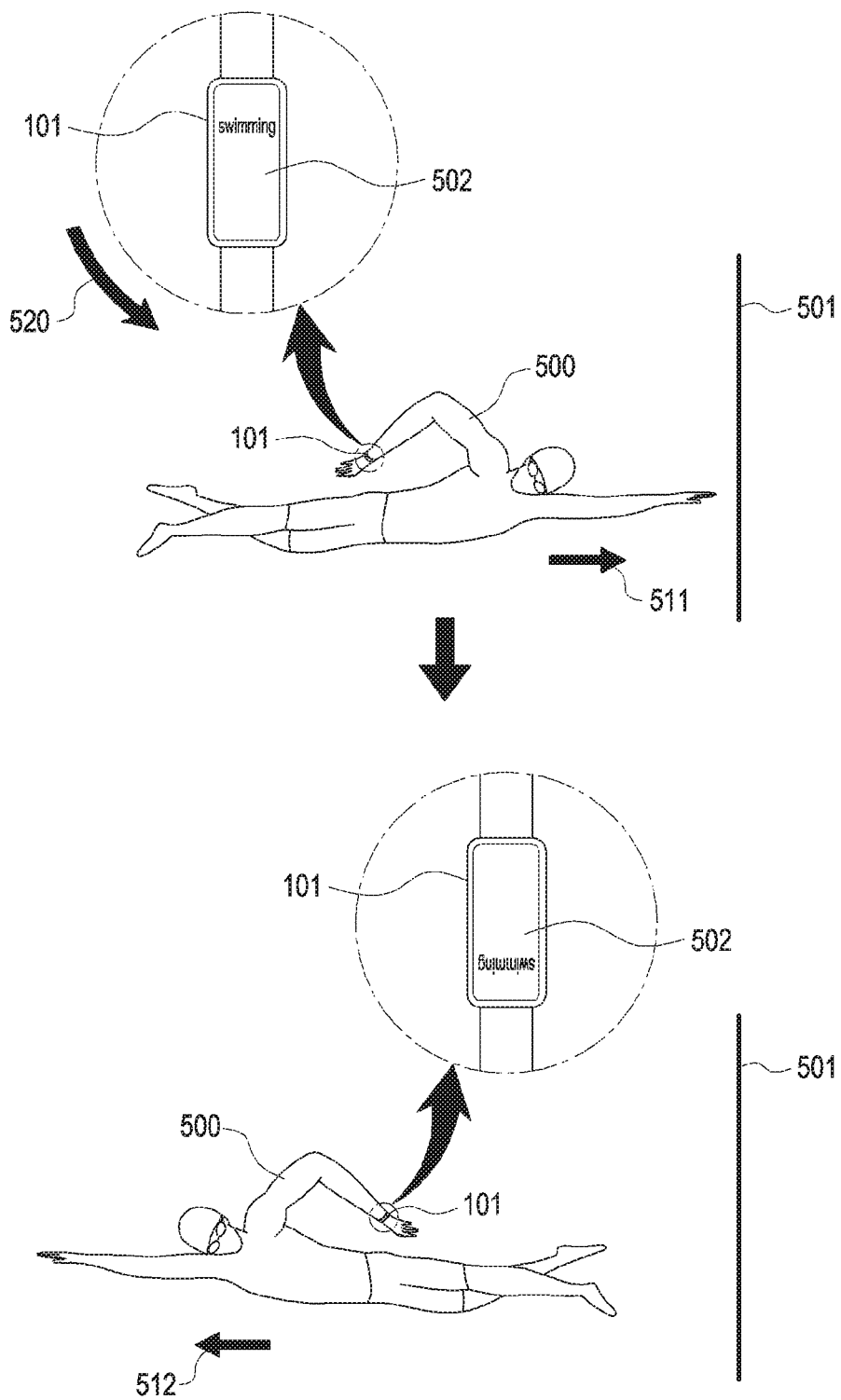
FIG. 5 illustrates a direction turn event according to an embodiment.

For example, as shown in FIG. 5, the user 500 may swim in a first direction 511, with the electronic device 101 on. The electronic device 101 may display a screen 502 indicating by an icon that the user is swimming or may additionally display at least part of swimming information. According to various embodiments, the electronic device 101 may pop up an icon indicating that the user is swimming.

After reaching one end 501 of the pool, the user 500 may turn the direction of exercise to a second direction 512. The electronic device 101 may detect an exercise direction turn event based on sensing data from the sensor module 176. For example, the electronic device 101 may detect an angular change 520 in the yaw direction according to the direction turn. The angular change 520 in the yaw direction that is greater than or equal to a threshold angle is not detected during strokes according to various swimming styles and, when direction turns, a yaw-direction angular change 520 greater than or equal to the threshold angle may be detected. The electronic device 101 may detect a direction turn event based on detection of a yaw-direction angular change 520 greater than or equal to the threshold angle. The yaw direction is merely an example. The electronic device 101 may previously store the features of the yaw/roll/pitch directions when direction turns and, if the identified sensing data matches the stored features, the electronic device 101 may detect the direction turn event. The electronic device 101 may previously store at least one of the value, feature, and waveform of sensing data corresponding to a specific gesture when the user turns the direction and use the same for comparison.

According to various embodiments, the electronic device 101 may detect a direction turn event based on sensing data from the acceleration sensor, rather than the gyro sensor. For example, the electronic device 101 may detect a direction turn event if an acceleration in a second direction 512 is measured while an acceleration in a first direction 511 is measured. The user may commonly kick one end 501 of the pool when changing direction and, thus, a relatively large acceleration in the second direction 512 may be measured. The electronic device 101 may detect a direction turn event if at least a threshold magnitude of acceleration is measured. The electronic device 101 may store per-user sensing data obtained from the acceleration sensor when the direction turns and use the data for future comparison.

According to various embodiments, the electronic device 101 may identify the direction in which the electronic device 101 faces in the absolute coordinate system based on sensing data from the geomagnetic sensor. The electronic device 101 may be placed in different directions between when the user 500 swims in the first direction 511 and when the user 500 swims in the second direction 512, and the electronic device 101 may detect a direction turn event based on a change in direction. According to various embodiments, the electronic device 101 may detect the direction turn event using at least one of the sensing data from the gyro sensor, the sensing data from the acceleration sensor, and the sensing data from the geomagnetic sensor.

Returning to the method of FIG. 4, according to various embodiments, upon identifying that a direction turn event is detected (yes in step 405), the electronic device 101 may identify that the workout environment is the pool environment in step 407. Upon identifying that a direction turn event is not detected (no in step 405), the electronic device 101 may identify that the workout environment is the outdoor environment in step 409.

According to various embodiments, the electronic device 101 may identify the workout environment using whether the direction turn event occurs, alone, or in conjunction with the position information described above in connection with FIG. 2. After detecting the workout environment using the position information, the electronic device 101 may use the direction turn event for identifying the lap time and the number of strokes per lap interval or updating distance, in which case the direction turn event may not be used during the course of identifying the workout environment.

Figure 6:
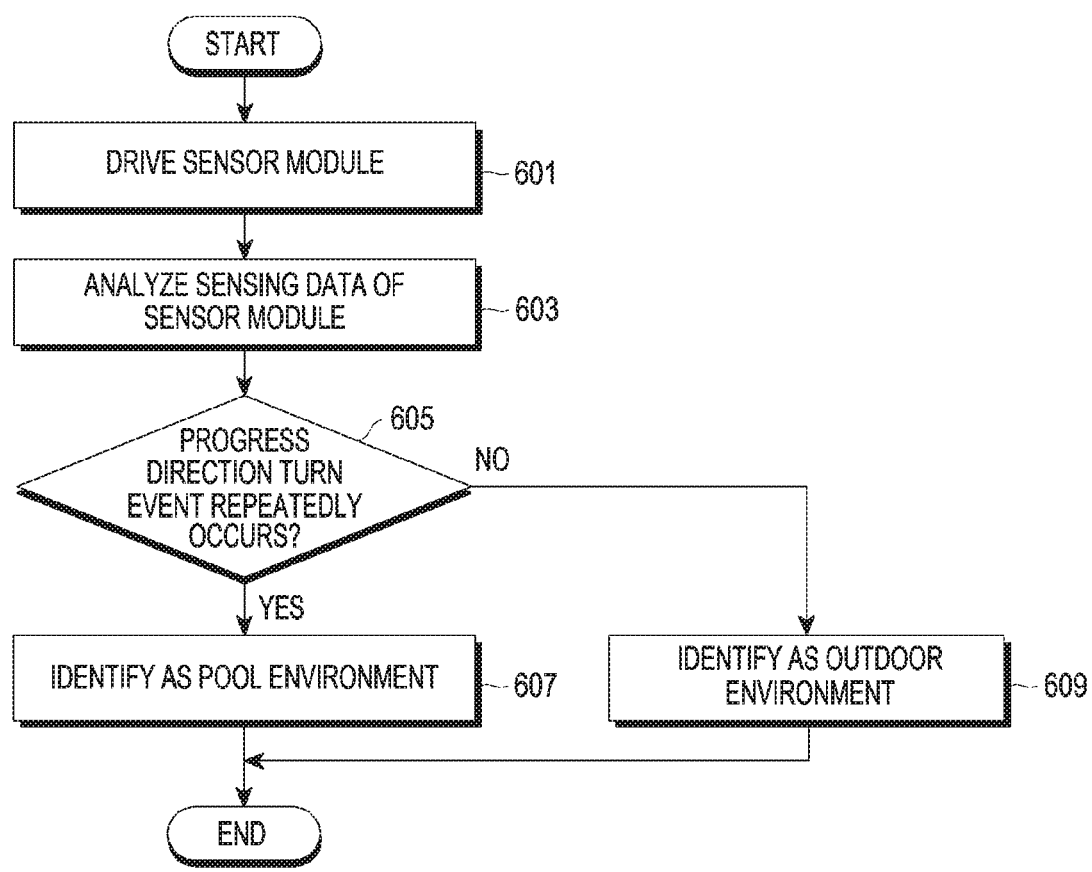
FIG. 6 illustrates a method for operating an electronic device according to an embodiment.

FIG. 6 illustrates a method for operating an electronic device according to an embodiment. Among the operations of FIG. 6, those already described above in connection with FIG. 4 are briefly described.

According to various embodiments, the electronic device 101 (e.g., the processor 120) may drive a sensor module 176 in step 601. The electronic device 101 may analyze sensing data from the sensor module 176 in step 603. In step 605, the electronic device 101 may identify whether progress direction turn events repeatedly occur based on the result of analysis. In the pool environment, the user may swim while repeatedly changing the swimming direction.

Upon identifying that progress direction turn events repeatedly occur (yes in step 605), the electronic device 101 may identify that the workout environment is the pool environment in step 607. In the outdoor environment, the user changes direction, but the number of repeated direction turns may be fewer than in the pool environment. Upon identifying that progress direction turn events do not repeatedly occur (no in step 605), the electronic device 101 may identify that the workout environment is the outdoor environment in step 609. For example, the electronic device 101 may identify that the workout environment is the outdoor environment if the number of repetitions of a progress direction turn event is less than or equal to a threshold number.

According to various embodiments, the electronic device 101 may also determine the workout environment based on whether the interval between progress direction turn events follows a predetermined period. The electronic device 101 may also identify that the workout environment is the pool environment if a similarity of the number of strokes occurring between direction turn events is equal to or greater than a designated threshold similarity and/or a similarity of the time difference between direction turn events is equal to or greater than a designated threshold similarity.

According to various embodiments, if progress direction turn events are repeatedly detected, the electronic device 101 may identify whether the workout environment is the pool environment or outdoor environment based on whether an additional condition is met. For example, a common swimming pool is a maximum 50 meters (m) in length, and it takes three minutes for an ordinary swimmer to swim the full length, or 50 strokes may be detected. This may indicate that when a time of at least three minutes is taken or at least 50 strokes are detected, the workout environment may be the outdoor environment. According to various embodiments, although repeated progress direction turn events are detected, if the time taken between when progress direction turn events are detected is at least the threshold time or the number of detected strokes is at least a threshold number, the electronic device 101 may identify that the workout environment is the outdoor environment.

Figure 7:
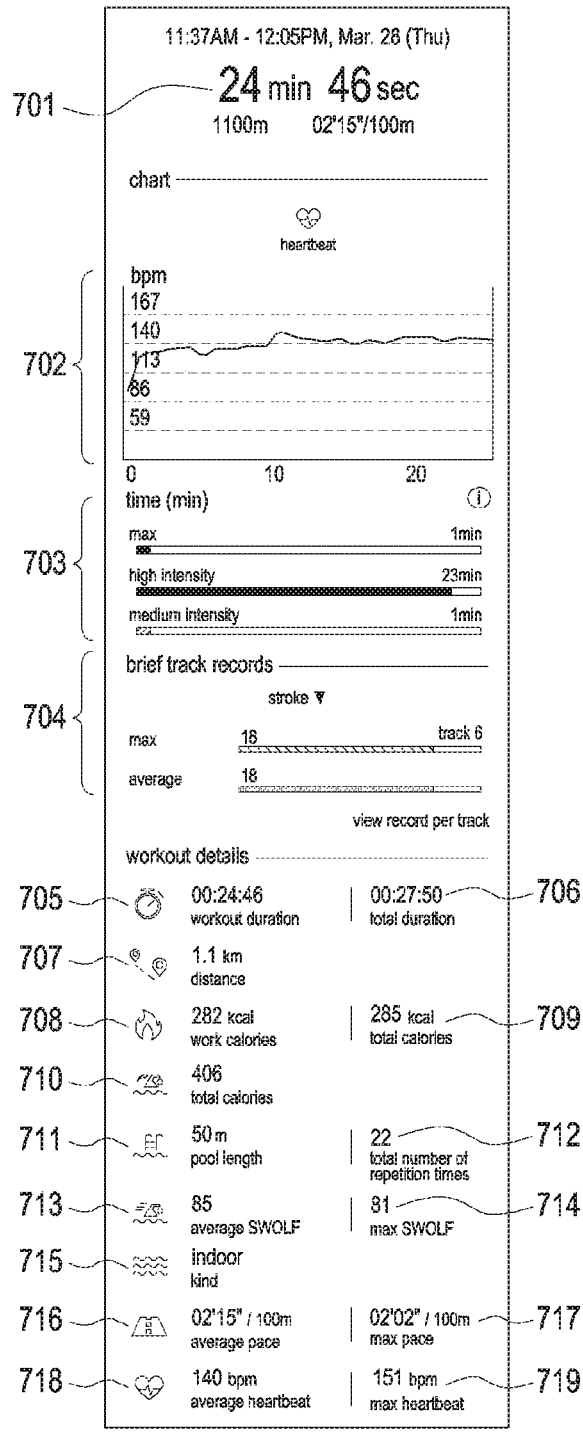
FIG. 7 illustrates a screen displayed on an electronic device corresponding to a pool environment according to an embodiment.

FIG. 7 illustrates a screen displayed on an electronic device corresponding to a pool environment according to an embodiment.

In FIG. 7, the electronic device 101 may provide full workout summary information 701. The full workout summary information 701 may include the total workout time, the total workout distance, and time taken per reference unit (e.g., 100 m) but is not limited to a specific type. In the pool environment, the electronic device 101 may identify the total workout distance based on the number of direction turn events. The electronic device 101 may identify the total workout distance by multiplying the number of direction turn events by the pre-identified length of the pool, or may detect one stroke based on sensing data from the motion sensor and/or pressure sensor. The electronic device 101 may previously identify the distance corresponding to one stroke based on the number of strokes detected between direction turn events, which may differ from user to user or may be a default value. The electronic device 101 may identify the workout distance based on information about the distance corresponding to one stroke and the number of strokes detected. The electronic device 101 may identify the workout distance using both the number of direction turn events and the result of detection of strokes.

According to various embodiments, the electronic device 101 may provide heartbeat information 702. The electronic device 101 may display the per-hour heartbeat in the form of a graph, but heartbeat information may be displayed in any format without limitations. The electronic device 101 may include a heartbeat sensor (e.g., an illumination device and a light receiving device), such as a photoplethysmograph (PPG) sensor and may obtain heartbeat information based on sensing data. It will be easily appreciated by one of ordinary skill in the art that the heartbeat sensor is not limited to a specific type.

According to various embodiments, the electronic device 101 may provide workout strength information 703. The electronic device 101 may divide the workout strength into, e.g., medium, high, and maximum, and may provide times required per workout strength in the form of a graph, but without limitation to a specific representation format. The electronic device 101 may identify the workout strength based on at least one of the measured heartbeat, number of strokes per unit time, and distance swum per unit time, but without limitations to a specific identification algorithm.

According to various embodiments, the electronic device 101 may provide interval record information 704. As set forth above, the electronic device 101 may identify that the user has moved in one interval based on detection of a direction turn event. The electronic device 101 may classify and manage at least one of the number of strokes, time swum, swimming style, heartbeat, calorie consumption, and speed per interval. The electronic device 101 may display information about an interval designated by the user or the current interval. The electronic device 101 may provide a designated type of workout information or may also provide various types of workout information based on a change type command from the user or lapse of a designated time.

According to various embodiments, the electronic device 101 may provide per-interval records. For example, the electronic device 101 may identify information about a plurality of intervals and, based thereon, provide per-interval records The per-interval records may include the number of strokes, swimming style, or time swum (lap time) in each interval but are not limited to a specific type.

According to various embodiments, the electronic device 101 may provide workout time information 705 and/or total time information 706. The electronic device 101 may classify, e.g., a time interval during which a stroke is detected, as a workout time and a time interval during which no stroke is detected as a break time. The electronic device 101 may provide a workout distance 707.

According to various embodiments, the electronic device 101 may provide information 708 about calories consumed by the workout and/or information 709 about total consumed calories. The electronic device 101 may identify the calories consumed by the workout based on the heartbeat measured during the workout time. The electronic device 101 may identify the calories consumed by the workout based on the heartbeat measured during the break time. The electronic device 101 may identify the total calorie consumption based on the identified total calorie consumption. According to various embodiments, the electronic device 101 may identify the calorie consumption based on (or additionally using) other sensing data than the heartbeat, such as the number of strokes and/or stroke posture, but calculation of the calorie consumption is not limited to a specific scheme.

According to various embodiments, the electronic device 101 may provide total strokes information 710. The electronic device 101 may identify an occurrence of a stroke based on sensing data from the pressure sensor and/or sensing data from the motion sensor.

According to various embodiments, the electronic device 101 may identify pool length information 711 based on the user's input or sensing data. For example, the electronic device 101 may identify that the moving distance between the times direction turn events have been detected is the pool length based on the result of measurement by the position measurement module. According to various embodiments, the electronic device 101 may identify the pool length based on the number of strokes between the times of detection of direction turn events. According to various embodiments, the electronic device 101 may identify the pool length based on position information about the current point. For example, the electronic device 101 may transmit information about the position of the electronic device 101 to an external electronic device, which may identify information about the building or facility corresponding to the position and return information about the pool length, which is at least part of the information, to the electronic device 101.

According to various embodiments, the electronic device 101 may provide information 712 about the number of times of repetition of one interval of the pool, such as based on the number of times of detection of direction turn events.

According to various embodiments, the electronic device 101 may provide information 713 about an average swolf index and/or information 714 about the maximum swolf index. The swolf index may be the sum of the total time taken to swim a designated distance (e.g., 50 m) and the number of strokes made in the designated distance.

According to various embodiments, the electronic device 101 may provide workout environment information 715. The configuration for identifying the workout environment has been described above in detail, and no further description thereof is given below.

According to various embodiments, the electronic device 101 may provide at least one of average pace information 716 and/or maximum pace information 717. The electronic device 101 has identified the distance swum and the time taken and, based on this information, the electronic device 101 may identify pace information.

According to various embodiments, the electronic device 101 may provide average heartbeat information 718 and/or maximum heartbeat information 719.

According to various embodiments, the electronic device 101 may provide at least part of the information of FIG. 7.

Figure 8:
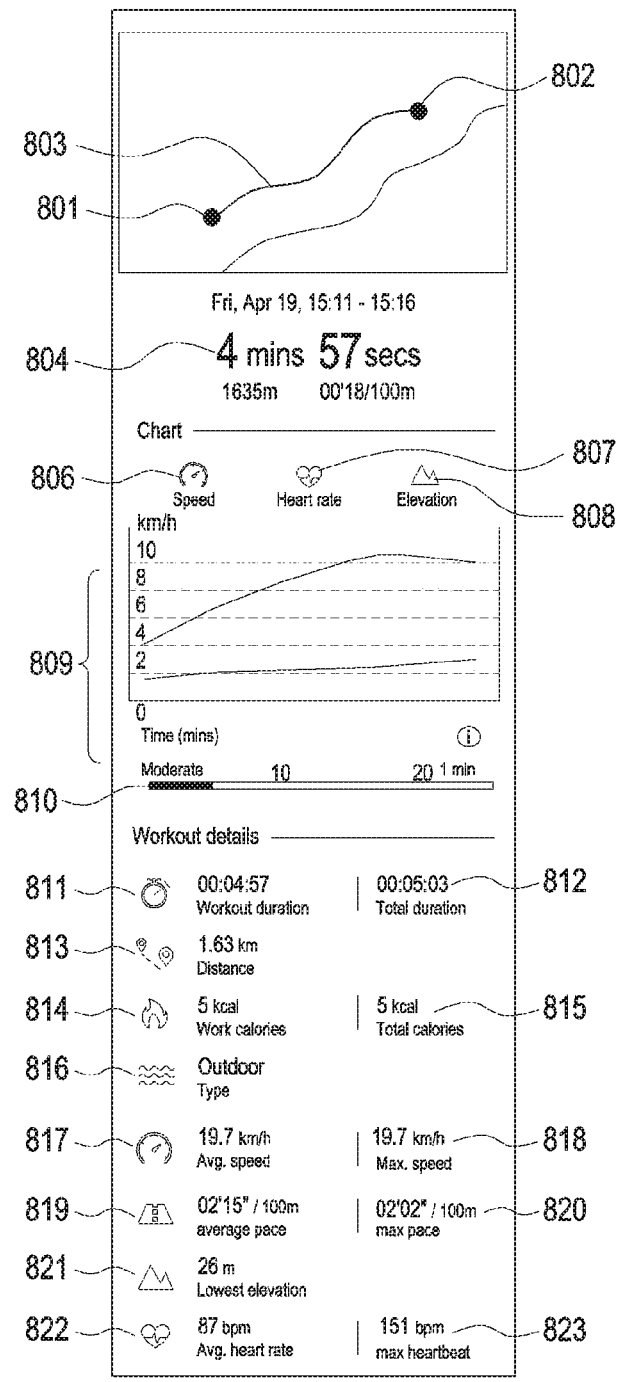
FIG. 8 illustrates a screen displayed on an electronic device corresponding to an outdoor environment according to an embodiment.

FIG. 8 illustrates a screen displayed on an electronic device corresponding to an outdoor environment according to an embodiment.

In FIG. 8, according to various embodiments, the electronic device 101 may provide movement trajectory information, including the start point 801, end point 802, and movement trajectory 803 on a map. The electronic device 101 may generate movement trajectory information based on the position information about the electronic device 101 identified by the position measurement module. The electronic device 101 may receive map data from the external electronic device and may constitute the movement trajectory information using the received map data and position information. Upon receiving no map data, the electronic device 101 may display the start point 801, end point 802, and movement trajectory 803 on a grid constituted of designated GPS coordinates. The electronic device 101 may store the movement trajectory of GPS coordinates, and when map data is received, synthesize the movement trajectory with the map data and provide the movement trajectory information obtained by synthesizing the movement trajectory with the map data. According to various embodiments, the electronic device 101 may determine the validity of movement trajectory and may selectively provide the movement trajectory based on the result of determination. For example, if the validity is less than or equal to a threshold, the electronic device 101 may be configured not to provide the movement trajectory.

According to various embodiments, the electronic device 101 may provide the total workout summary information 804 about the total time. The full workout summary information 804 may include the total workout time, the total workout distance, and time taken per reference unit (e.g., 100 m) but is not limited to a specific type.

According to various embodiments, the electronic device 101 may provide an icon 806 for providing the speed, an icon 807 for providing the heartbeat, and/or an icon 808 for providing the altitude (or elevation). The electronic device 101 may provide information (e.g., per-time speed information 809) corresponding to a selected icon.

According to various embodiments, the electronic device 101 may provide information 810 indicating the current pace and the current time taken on the time bar. The information 810 indicating the pace may be identified and provided, e.g., per designated distance unit or per distance unit selected by the user. For example, if 100 m is designated as the distance unit, the electronic device 101 may provide the average pace, stroke count, and consumed time information every 100 m.

According to various embodiments, the electronic device 101 may provide workout time information 811 and/or total consumed time information 812.

According to various embodiments, the electronic device 101 may provide information 813 about the distance swum, information 814 about calories consumed by the workout and/or information 815 about total consumed calories.

According to various embodiments, the electronic device 101 may provide workout environment information 816.

According to various embodiments, the electronic device 101 may provide average speed information 817, maximum speed information 818, average pace information 819, and/or maximum pace information 820.

According to various embodiments, the electronic device 101 may provide altitude information (for example, lowest elevation 821). The electronic device 101 may obtain the altitude information based on sensing data from the pressure sensor, or by using the altitude based on the GPS value. The electronic device 101 may modify the altitude information obtained based on the sensing data from the pressure sensor with the GPS value and provide the result, or vice versa.

According to various embodiments, the electronic device 101 may provide average heartbeat information 822 and/or maximum heartbeat information 823.

According to various embodiments, the electronic device 101 may provide at least part of the information of FIG. 8. Information provided in the outdoor environment may at least partially differ from the information provided in the pool environment of FIG. 7. For example, in the outdoor environment of FIG. 8, movement trajectory information indicating the user's total workout trajectory and, in the pool environment, the corresponding time (lap time) and stroke count while swimming along one edge of the swimming pool, such as interval record summary information, may be provided. The algorithms for identifying the workout information in the outdoor environment and pool environment may be implemented to be different from each other, and sensors activated in the outdoor environment and the pool environment may also be implemented to be different from each other.

Figure 9:
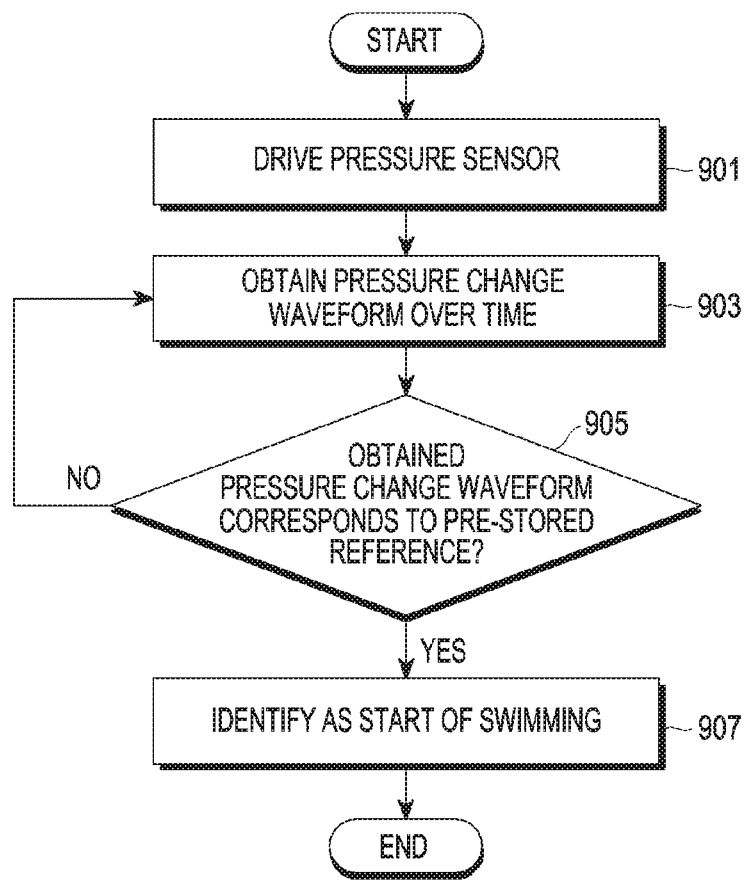
FIG. 9 illustrates a method for operating an electronic device according to an embodiment.
Figure 10:
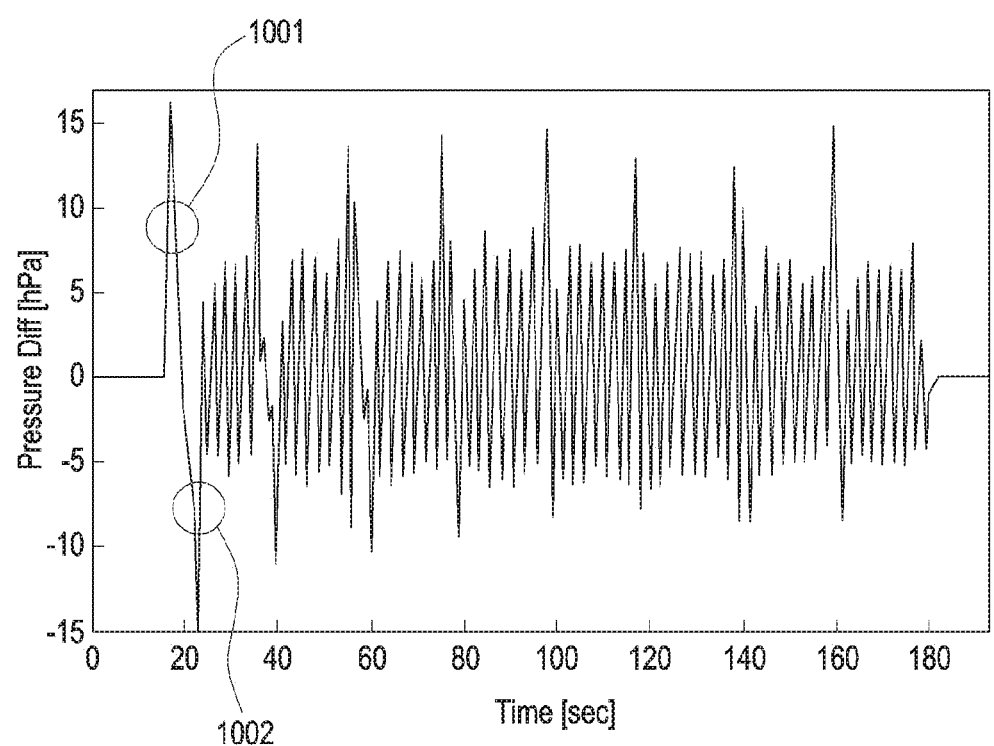
FIG. 10 illustrates a pressure change waveform over time according to an embodiment.

FIG. 9 illustrates a method for operating an electronic device according to an embodiment. FIG. 10 illustrates a pressure change waveform over time according to an embodiment.

In FIG. 9, according to various embodiments, the electronic device 101 (e.g., the processor 120) may drive the pressure sensor in step 901. In step 903, the electronic device 101 may obtain a pressure change waveform over time. In step 905, the electronic device 101 may identify whether the obtained pressure change waveform corresponds to a pre-stored reference. For example, the electronic device 101 may compare a feature obtained from the sensed pressure change waveform with a feature of the pre-stored reference, such as a graph of variations in pressure with respect to a reference pressure when the user moves his or her arms in and out of the water, with the electronic device 101 on his or her wrist. The reference pressure may be set to a pressure measured while the pressure change remains substantially zero.

Since a stroke is determined based on the variation in pressure with respect to the reference pressure, misrecognition due to an altitude change may be prevented. The pressure in the water may be higher than the atmospheric pressure. Thus, while the electronic device 101 is led into the water by a stroke, the pressure sensed by the pressure sensor may sharply increase (e.g., 5 hectopascals (hPa) to 6 hPa). The pressure sensed while the electronic device 101 exits the water may drastically reduce.

FIG. 10 illustrates measured pressure values. The electronic device 101 may identify the sharp pressure increase 1001 and the sharp pressure decrease 1002. The reference may include at least one of a value, feature, and waveform indicating the sharp pressure increase and pressure decrease. Returning to the method in FIG. 9, the electronic device 101 may identify whether a swim workout starts based on the result of comparison between the measured data and the reference in step 907. The swim workout may be identified to have started.

According to various embodiments, the electronic device 101 may identify whether a swim workout starts by keeping the pressure sensor which consumes relatively little power on (or periodically activating the pressure sensor). The electronic device 101 may be configured to keep the touch-screen panel (TSP) on (or periodically activate the TSP). The electronic device 101 may identify whether a swim starts based on a change in capacitance from the TSP. For example, if the TSP enters the water, the capacitance (e.g., mutual capacitance and/or self capacitance) of the TSP may instantaneously vary. If the TSP exits the water, the capacitance of the TSP may momentarily change as opposed to when the TSP enters the water. The electronic device 101 may identify whether there is a stroke based on a change in the capacitance over time of the TSP, and may thus identify whether a swim starts.

According to various embodiments, the electronic device 101 may identify whether a swim starts based on a change in the humidity value sensed by a humidity sensor or a change in the value sensed by a water sensor.

Although the sensing data from the pressure sensor and the sensing data from the TSP have been described to identify whether a swim commences, this is merely an example, and the sensing data from the pressure sensor and the sensing data from the TSP may also be available in the process of identifying the workout environment and/or workout information. It will be easily appreciated by one of ordinary skill in the art that data (e.g., sensing data from the motion sensor) for detecting a stroke is available in identifying whether a swim begins.

Figure 11:
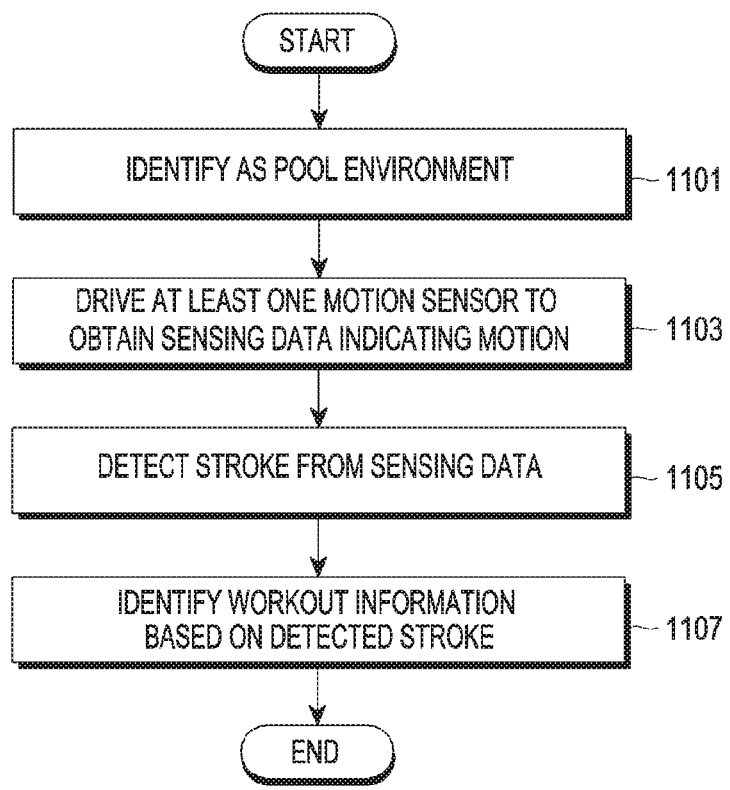
FIG. 11 illustrates a method for operating an electronic device according to an embodiment.

FIG. 11 illustrates a method for operating an electronic device according to an embodiment.

In FIG. 11, according to various embodiments, the electronic device 101 (e.g., the processor 120) may identify that the workout environment is the pool environment in step 1101. In step 1103, the electronic device 101 may drive at least one motion sensor, thereby obtaining sensing data indicating motion. In step 1105, the electronic device 101 may detect a stroke from the sensing data. The electronic device 101 may perform low pass filtering on the sensing data from the motion sensor, thereby obtaining noise-free sensing data. The electronic device 101 may generate a physical quantity variation feature based on the reference data and noise-free sensing data. The electronic device 101 may divide into stroke units based on the physical quantity feature and identify the number of strokes according to the result of division. The electronic device 101 may identify the swimming style based on the waveform feature of sensing data (e.g., at least one of the shape of waveform, distribution, peak-to-valley value, maximum value, and/or minimum value). Different determination references may apply to strokes, e.g., per swimming style.

In step 1107, the electronic device 101 may identify workout information based on the detected stroke. For example, the electronic device 101 may provide information about per-interval stroke counts according to the number of strokes between the times of occurrence of direction turn events. The above-described stroke detection scheme may also apply to the outdoor environment.

Figure 12:
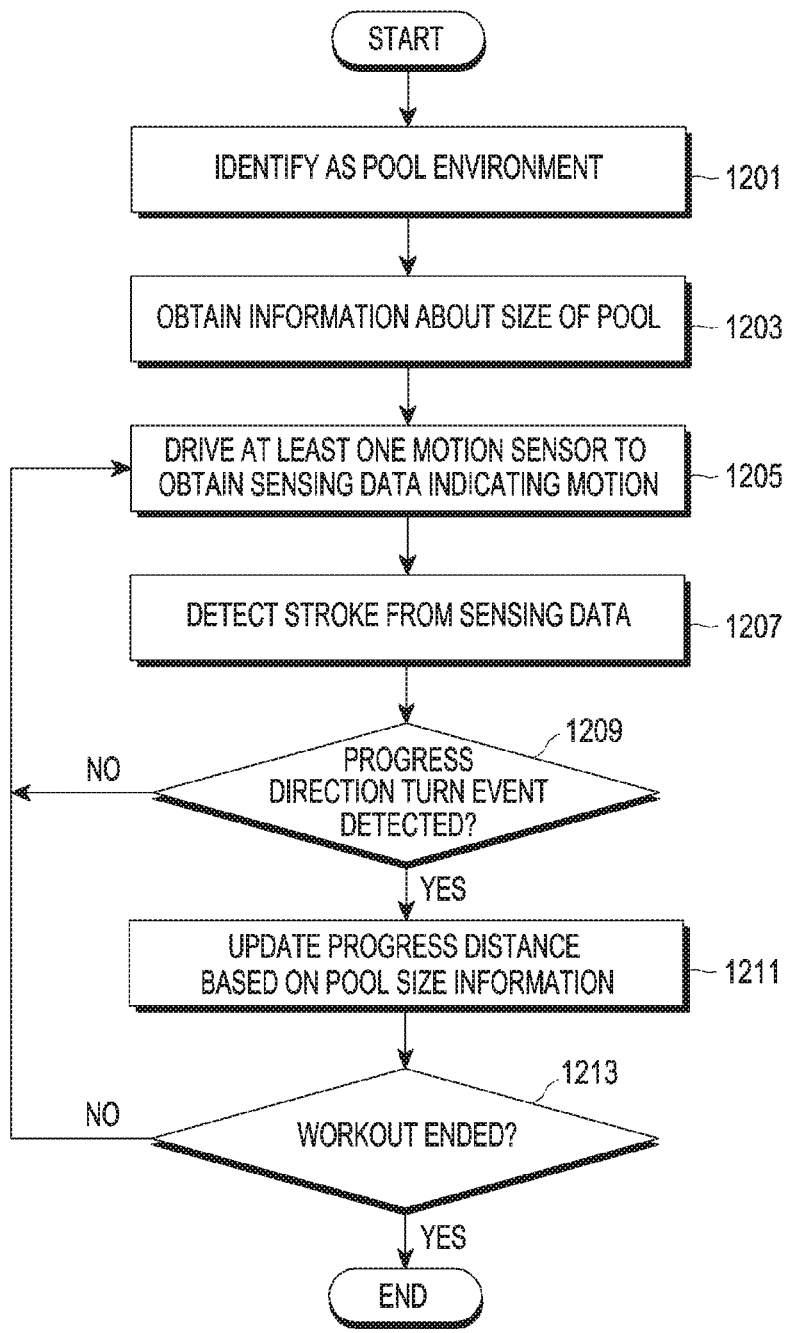
FIG. 12 illustrates a method for operating an electronic device according to an embodiment.

FIG. 12 illustrates a method for operating an electronic device according to an embodiment.

In FIG. 12, according to various embodiments, the electronic device 101 (e.g., the processor 120) may identify that the workout environment is the pool environment in step 1201. In step 1203, the electronic device 101 may obtain information about the size of the swimming pool. For example, the electronic device 101 may previously obtain the pool size information. The electronic device 101 may estimate the pool size information based on the stroke count and the swum distance corresponding to one stroke. The electronic device 101 may receive the pool size information from an external electronic device. In step 1205, the electronic device 101 may drive at least one motion sensor, thereby obtaining sensing data indicating motion. In step 1207, the electronic device 101 may detect a stroke from the sensing data.

According to various embodiments, the electronic device 101 may detect a progress direction turn event in step 1209. If a progress direction turn event is detected (yes in step 1209), the electronic device 101 may update the swum distance based on the pool size information in step 1211. For example, if the distance swum thus far is 150 m, and the pool size is 50 m, and a progress direction turn event is detected, then the electronic device 101 may update the total swum distance as 200 m. The electronic device 101 may provide the total swum distance in such a manner as to update the swum distance with the size of the swimming pool or as to update the swum distance per stroke and, if a progress direction turn event occurs, modifies the swum distance.

Upon detecting a progress direction turn event, the electronic device 101 may restart the timer of per-interval consumed time (lap time). The electronic device 101 may set the timer to zero and, upon determining the start of a swim (e.g., when a stroke is detected or when an acceleration not less than a threshold acceleration in a specific direction is detected) may start the timer. The break time identified during the above-described course may be managed separately from the workout time. In step 1213, the electronic device 101 may determine whether the workout ends. If a swim is identified not to start within a threshold time after the timer is set to zero, the electronic device 101 may identify that the workout has been terminated.

Figure 13:
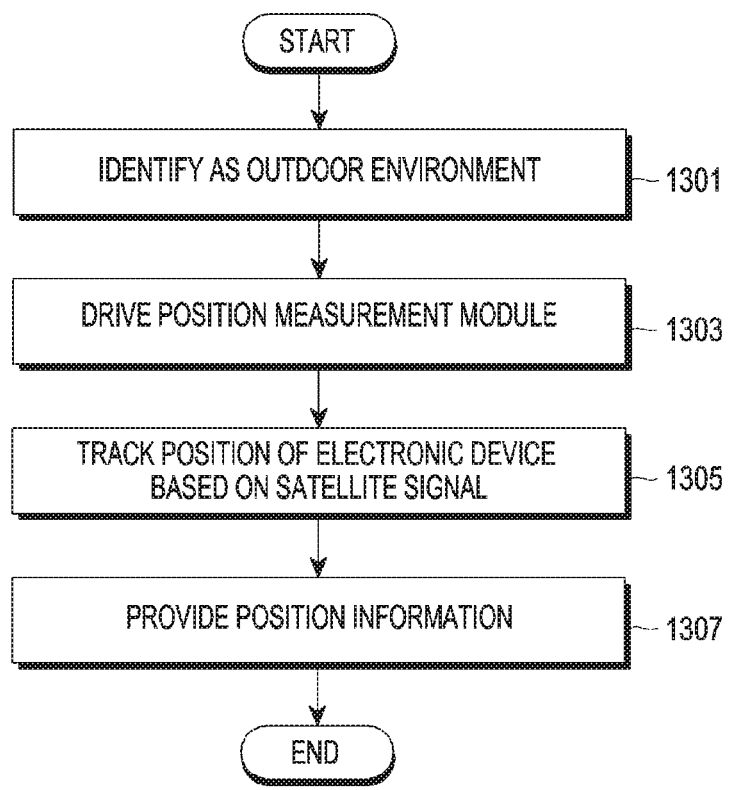
FIG. 13 illustrates a method for operating an electronic device according to an embodiment.

FIG. 13 illustrates a method for operating an electronic device according to an embodiment.

According to various embodiments, the electronic device 101 (e.g., the processor 120) may identify that the workout environment is the outdoor environment in step 1301. In step 1303, the electronic device 101 may drive the position measurement module. For example, the electronic device 101 may keep the position measurement module active after the position measurement module has been driven, or may maintain the active state of the position measurement module which has already been activated.

In step 1305, the electronic device 101 may track the position of the electronic device 101 based on satellite signals. If positioned in the water, the electronic device 101 may fail to obtain position information. This may indicate that the user may obtain position information only when the electronic device 101 is positioned out of the water when making a stroke. As acquisition of position information fails, tracking accuracy likely decreases as compared with tracking by continuous movements on the ground. According to various embodiments, the electronic device 101 may perform smoothing on the obtained position information and may identify the movement trajectory of the electronic device 101 based on the smoothed data. In step 1307, the electronic device 101 may provide movement trajectory information.

According to various embodiments, the electronic device 101 may identify the movement trajectory further considering the detected stroke. For example, although the user takes a break in place with the electronic device 101 on, the moving distance may be treated as continuing to increase due to errors in the position information. The electronic device 101 may prevent a moving distance error from occurring due to an error in the position information by refraining from updating the moving distance in the interval where no stroke is detected.

According to various embodiments, the electronic device 101 may set different resonance frequencies of the antenna for receiving satellite signals between when the electronic device 101 is in the water and when the electronic device 101 is out of the water. For example, unless the electronic device 101 is in the water, the antenna resonance frequency may be adjusted to a first frequency band designated by a first permittivity of the air via a resonance frequency adjustment circuit. When the electronic device 101 is in the water, the antenna resonance frequency may be adjusted to a second frequency band designated by a second permittivity of the water via the resonance frequency adjustment circuit. The resonance frequency adjustment circuit may include a switching element and at least one capacitor and/or at least one inductor available for adjusting the resonance frequency.

Figure 14:
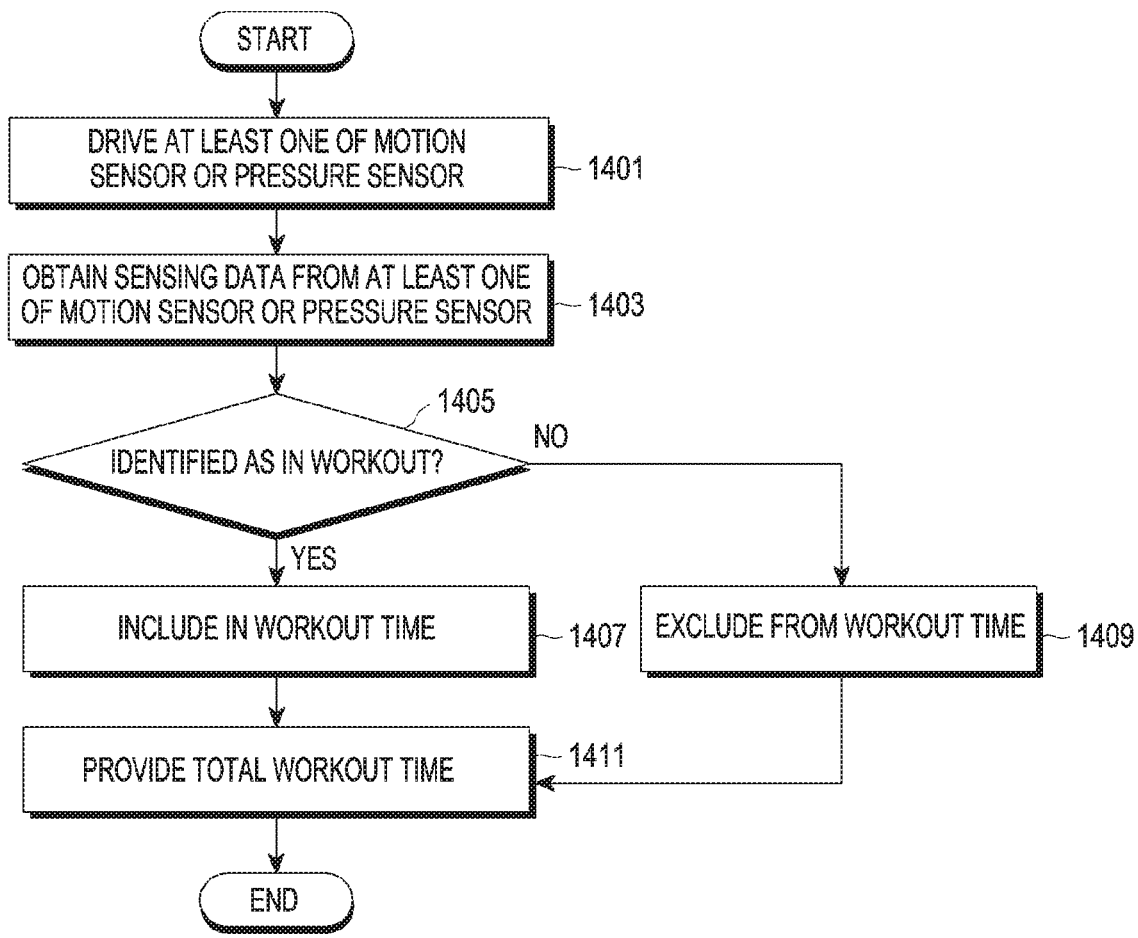
FIG. 14 illustrates a method for operating an electronic device according to an embodiment.

FIG. 14 illustrates a method for operating an electronic device according to an embodiment.

In FIG. 14, according to various embodiments, the electronic device 101 (e.g., the processor 120) may drive at least one of the motion sensor and pressure sensor in step 1401. In step 1403, the electronic device 101 may obtain sensing data from at least one of the motion sensor and pressure sensor. In step 1405, the electronic device 101 may identify whether the current state is in workout as a result of obtaining sensing data. Specifically, the electronic device 101 may identify whether a stroke occurs based on the result of analysis of data from the motion sensor and/or the result of analysis of data from the pressure sensor. Upon identifying that a stroke occurs, the electronic device 101 may identify that the current state is a workout. Upon identifying that no stroke occurs, the electronic device 101 may identify that the current state is not a workout, i.e., a break state.

According to various embodiments, upon identifying that the current state is a workout (yes in step 1405), the electronic device 101 may apply the consumed time of the current state to the workout time in step 1407. Upon identifying that the current state is not a workout (no in step 1405), the electronic device 101 may exclude the consumed time of the current state from the workout time in step 1409. In step 1411, the electronic device 101 may provide the total workout time which is the total consumed time less the break time.

Figure 15:
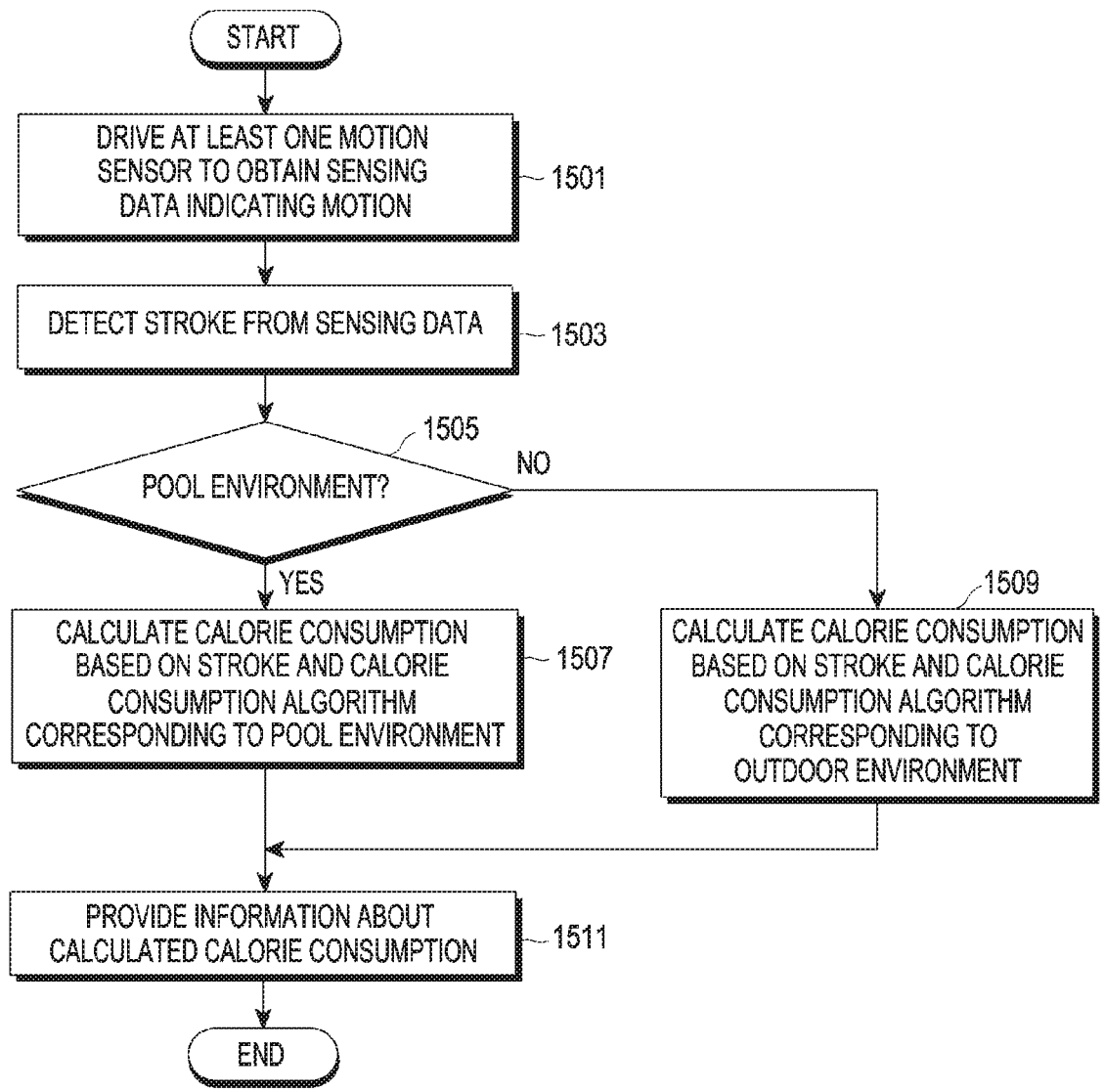
FIG. 15 illustrates a method for operating an electronic device according to an embodiment.

FIG. 15 illustrates a method for operating an electronic device according to an embodiment.

In FIG. 15, according to various embodiments, the electronic device 101 (e.g., the processor 120) may obtain sensing data indicating motion by driving at least one motion sensor in step 1501. In step 1503, the electronic device 101 may detect a stroke from the sensing data. In step 1505, the electronic device 101 may identify whether the workout environment is the pool environment. If the workout environment is identified to be the pool environment (yes in step 1505), the electronic device 101 may calculate calorie consumption based on the stroke and calorie consumption algorithm corresponding to the pool environment in step 1507. If the workout environment is identified to be the outdoor environment (no in step 1505), the electronic device 101 may calculate calorie consumption based on the stroke and calorie consumption algorithm corresponding to the outdoor environment in step 1509. The per-stroke calorie consumption in the pool environment may be set to differ from the per-stroke calorie consumption in the outdoor environment. In step 1511, the electronic device 101 may provide information about the calculated calorie consumption.

Although it has been described in the above-described embodiment that the electronic device 101 stores different calorie consumption calculation algorithms per workout environment, this is merely an example, and various algorithms for producing workout information may be set to differ per workout environment. Alternatively, the electronic device 101 may yield workout information based on the same algorithm regardless of the workout environment. For example, the electronic device 101 may calculate the calorie consumption based on the heartbeat sensed by the heartbeat sensor, in which case the same algorithm may be used for workout environments.

Figure 16:
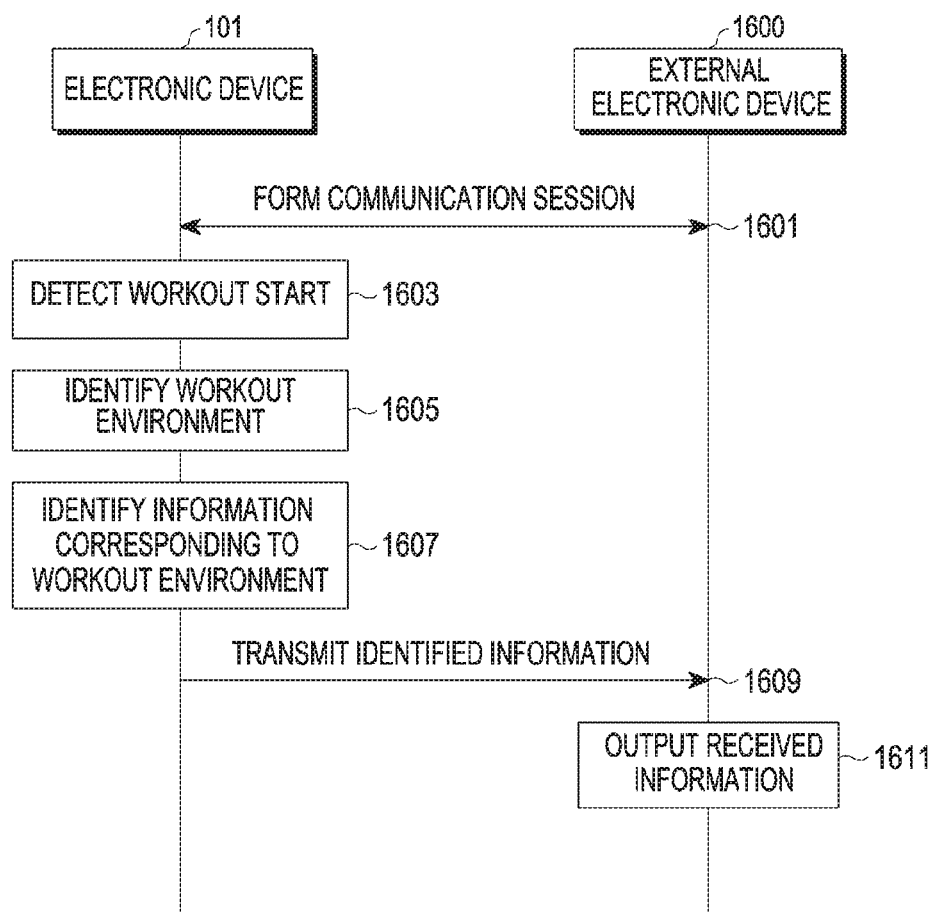
FIG. 16 illustrates a method for operating an electronic device and an external electronic device according to an embodiment.
Figure 17:
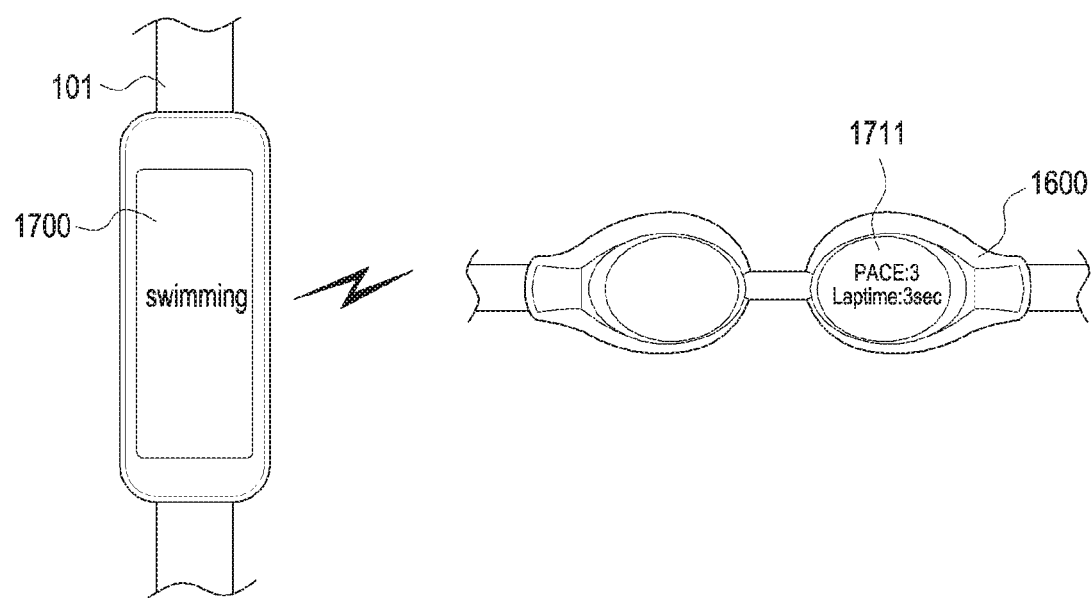
FIG. 17 illustrates an electronic device and an external electronic device receiving data from the electronic device and outputting according to an embodiment.

FIG. 16 illustrates a method for operating an electronic device and an external electronic device according to an embodiment. FIG. 17 illustrates an electronic device and an external electronic device receiving data from the electronic device and outputting according to an embodiment. The steps of FIG. 16 that have already been described above will be briefly described.

In FIG. 16, according to various embodiments, the electronic device 101 (e.g., the processor 120) may form a communication session with an external electronic device 1600 in step 1601, based on a short-range communication scheme or via a relay device. In step 1603, the electronic device 101 may detect the start of a workout. In step 1605, the electronic device 101 may identify the workout environment. In step 1607, the electronic device 101 may identify information corresponding to the workout environment. In step 1609, the electronic device 101 may transmit the identified information to the external electronic device 1600. The external electronic device 1600 may output the received information in step 1611. For example, the external electronic device 1600 may be implemented as swimming goggles as shown in FIG. 17 and may include a transparent display.

The electronic device 101 may display a screen 1700 indicating that the user is swimming and may transmit workout information to the external electronic device 1600. The external electronic device 1600 may display at least part 1711 of the received workout information on the transparent display. Thus, the user may identify the workout information in real-time. The external electronic device 1600 is not limited to a specific type, nor is the received workout information limited to a specific output format. For example, if the external electronic device 1600 is implemented as an earphone, the workout information may be output in a voice. According to various embodiments, the electronic device 101 may identify type information about the external electronic device 1600 and may identify the workout information to be transmitted based on the type information. For example, if the external electronic device 1600 is identified to be a type of swimming goggles, the electronic device 101 may transmit text indicating pace information and lap time information among multiple pieces of workout information to the external electronic device 1600. For example, if the external electronic device 1600 is identified to be a type of smartphone, the electronic device 101 may transmit the entire workout information. If the external electronic device 1600 is identified to be a type of earphone, the electronic device 101 may transmit data resultant from converting at least part of the workout information into voice to the external electronic device 1600. As set forth above, the electronic device 101 may select the type of data to be transmitted and/or convert the data format depending on the type of the external electronic device 1600.

Figure 18:
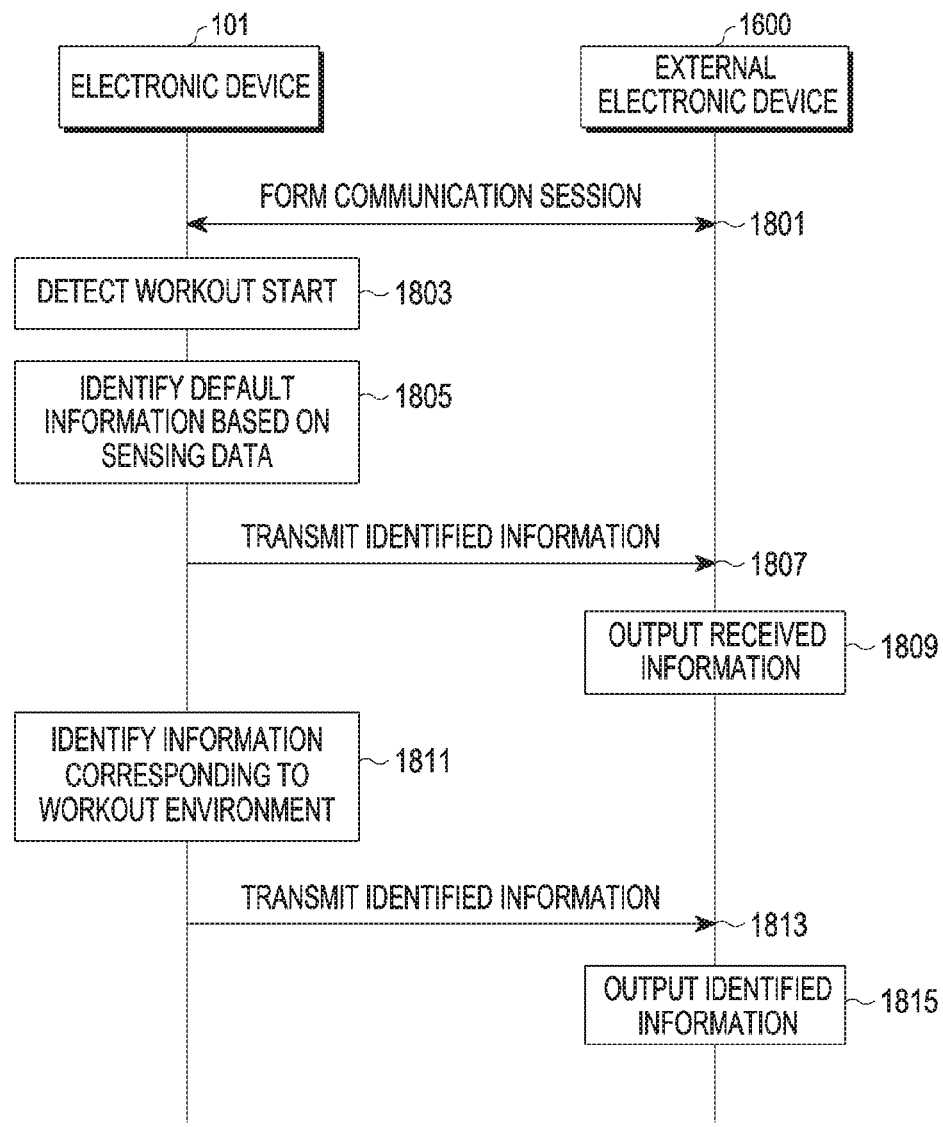
FIG. 18 illustrates a method for operating an electronic device and an external electronic device according to an embodiment.

FIG. 18 illustrates a method for operating an electronic device and an external electronic device according to an embodiment.

In FIG. 18, according to various embodiments, the electronic device 101 (e.g., the processor 120) may form a communication session with an external electronic device 1600 in step 1801. In step 1803, the electronic device 101 may detect the start of a workout. The electronic device 101 may start to identify the workout environment after detecting the start of workout. As described above, it may take time to definitely confirm the workout environment. In step 1805, the electronic device 101 may identify default information based on sensing data. For example, the electronic device 101 may provide pace, real-time per-interval consumed time (lap time) information, and total distance information, as the default information. The real-time per-interval consumed time may be provided in such a form as a timer and, thus, it may be provided even before the workout environment is definitely confirmed. In step 1807, the electronic device 101 may transmit the identified information to the external electronic device 1600. In step 1809, the external electronic device 1600 may output the received information. According to various embodiments, the electronic device 101 may be configured to transmit any one type of information of information corresponding to the outdoor environment or information corresponding to the pool environment to the external electronic device 1600.

In step 1811, according to various embodiments, the electronic device 101 may identify information corresponding to the workout environment. After the workout environment is definitely confirmed, the electronic device 101 may identify the information corresponding to the confirmed workout environment. In step 1813, the electronic device 101 may transmit the identified information to the external electronic device 1600. In step 1815, the external electronic device 1600 may output the identified information.

Figure 19:
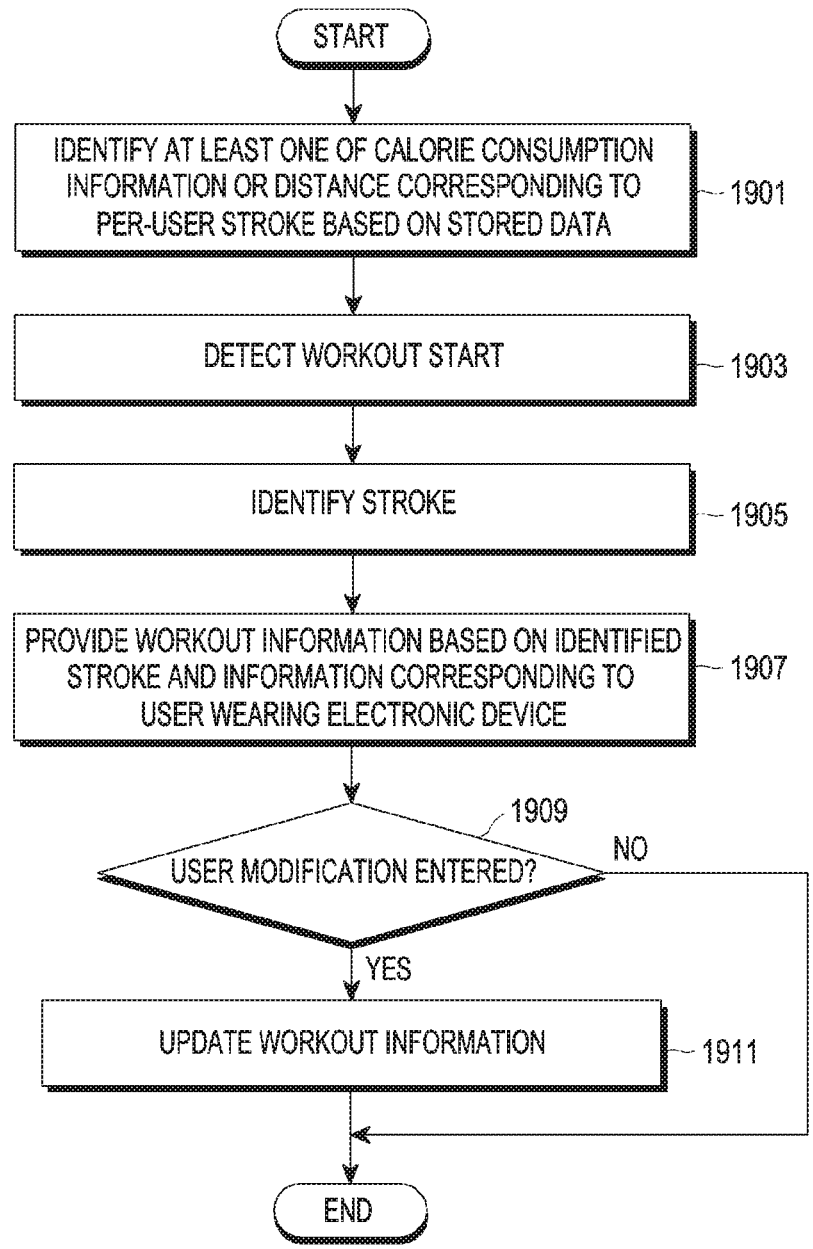
FIG. 19 illustrates a method for operating an electronic device according to an embodiment.

FIG. 19 illustrates a method for operating an electronic device according to an embodiment.

In FIG. 19, according to various embodiments, the electronic device 101 (e.g., the processor 120) may identify at least one of distance and calorie consumption information corresponding to the per-user stroke based on stored data in step 1901. The electronic device 101 may identify the total number of strokes and the total distance based on the prior workout information and, thus, the electronic device 101 may identify user-specified information about the per-stroke distance. The electronic device 101 may identify information specified per user for per-stroke calorie consumption based on the total distance and the total calorie consumption information.

According to various embodiments, the electronic device 101 may detect the start of a workout in step 1903. In step 1905, the electronic device 101 may identify a stroke. As described above, the electronic device 101 may identify the occurrence of a stroke based on sensing data from the motion sensor and/or pressure sensor. In step 1907, the electronic device 101 may provide workout information based on information corresponding to the user wearing the electronic device 101 and the identified stroke. For example, the electronic device 101 may update and provide the total moving distance in such a manner as to add per-stroke distances to the total moving distance information. In step 1909, the electronic device 101 may identify whether a user modification is entered. If a user modification is entered (yes in step 1909), the electronic device 101 may update the workout information in step 1911. The electronic device 101 may also update per-stroke distance or per-stroke calorie consumption information. If a user modification is not entered, the method ends.

According to an embodiment, an electronic device 101 may comprise a display (e.g., the display (e.g., the display device 160) device 160), a position measurement module (e.g., a GNSS module) configured to receive a satellite signal from a satellite and output position information about the electronic device 101, at least one sensor (e.g., at least one sensor of the sensor module 176) configured to sense at least one of a motion of the electronic device 101 or a posture of the electronic device 101, at least one processor (e.g., the processor 120) operatively connected with the display (e.g., the display device 160), the position measurement module (e.g., a GNSS module), and the at least one sensor (e.g., at least one sensor of the sensor module 176), and a memory (e.g., the memory 130) operatively connected with the at least one processor (e.g., the processor 120). The memory (e.g., the memory 130) may store instructions executed to enable the at least one processor (e.g., the processor 120) to identify a workout environment of a user of the electronic device 101 as a pool environment based on the position information about the electronic device 101 not being obtained by the position measurement module (e.g., a GNSS module) and control the display (e.g., the display device 160) to display a first screen including at least part of information corresponding to the pool environment based on sensing data obtained via the at least one sensor (e.g., at least one sensor of the sensor module 176). The memory (e.g., the memory 130) may store instructions executed to enable the at least one processor (e.g., the processor 120) to obtain the position information about the electronic device 101 by the position measurement module (e.g., a GNSS module), identify the workout environment as the pool environment based on the position information about the electronic device 101 corresponding to a recursive pattern and control the display (e.g., the display device 160) to display the first screen, identify the workout environment as an outdoor environment based on the position information about the electronic device 101 not corresponding to the recursive pattern and control the display (e.g., the display device 160) to display a second screen including at least part of information corresponding to the outdoor environment based on the sensing data and the position information about the electronic device 101.

According to an embodiment, the instructions may be further configured to enable the at least one processor (e.g., the processor 120) to identify whether the position information about the electronic device 101 corresponds to the recursive pattern based on whether a plurality of pieces of position information of the electronic device 101 obtained during a designated time meet a designated condition.

According to an embodiment, the instructions may be further configured to enable the at least one processor (e.g., the processor 120) to identify whether a progress direction turn event indicating a change in a progress direction of a user wearing the electronic device 101 is detected based on the sensing data obtained via the at least one sensor (e.g., at least one sensor of the sensor module 176).

According to an embodiment, the instructions may be further configured to enable the at least one processor (e.g., the processor 120) to, as part of identifying whether the progress direction turn event is detected, detect the progress direction turn event based on at least one of detection of a rotation of the electronic device 101 to a designated direction based on the sensing data or detection of an acceleration greater than or equal to a threshold acceleration based on the sensing data.

According to an embodiment, the instructions may be further configured to enable the at least one processor (e.g., the processor 120) to identify the workout environment as the pool environment based on the detected progress direction turn event.

According to an embodiment, the instructions may be further configured to enable the at least one processor (e.g., the processor 120) to identify at least one of a time taken to swim along an interval of swimming pool corresponding to the pool environment or a total workout distance of the user based on the progress direction turn event and an additional progress direction turn event detected after the progress direction turn event. The information corresponding to the pool environment may include at least one of the time taken to swim along the interval of swimming pool or the total workout distance.

According to an embodiment, the instructions may be further configured to enable the at least one processor (e.g., the processor 120) to detect a plurality of strokes and a number of the plurality of strokes based on the sensing data obtained via the at least one sensor (e.g., at least one sensor of the sensor module 176) between when the progress direction turn event occurs and when the additional progress direction turn event occurs. The information corresponding to the pool environment may include the number of the plurality of strokes in the interval of the swimming pool.

According to an embodiment, the instructions may be further configured to enable the at least one processor (e.g., the processor 120) to, as part of detecting the number of the plurality of strokes, filter the sensing data, divide the filtered sensing data per stroke unit, and detect the number of the plurality of strokes based on a result of the division.

According to an embodiment, the electronic device 101 may further comprise a pressure sensor configured to sense a pressure around the electronic device 101. According to an embodiment, the instructions may be further configured to enable the at least one processor (e.g., the processor 120) to determine that the user starts a workout based on detecting a pressure change with a designated feature using the pressure sensor.

According to an embodiment, the electronic device 101 may further comprise a touchscreen panel configured to detect a touch on the display (e.g., the display device 160). According to an embodiment, the instructions may be further configured to enable the at least one processor (e.g., the processor 120) to determine that the user starts a workout based on detecting a capacitance change with a designated feature using the touchscreen panel.

According to an embodiment, the instructions may be further configured to enable the at least one processor (e.g., the processor 120) to, while controlling the display (e.g., the display device 160) to display the second screen, control the display (e.g., the display device 160) to the second screen including information about a trajectory along which the electronic device 101 moves.

According to an embodiment, the instructions may be further configured to enable the at least one processor (e.g., the processor 120) to perform smoothing on the position information about the electronic device 101 measured by the position measurement module (e.g., a GNSS module) and obtain the information about the trajectory along which the electronic device 101 moves based on the smoothed position information.

According to an embodiment, the electronic device 101 may further comprise a communication module (e.g., the communication module 190) configured to communicate with an external electronic device (e.g., the external electronic device 1600). The instructions may be further configured to enable the at least one processor (e.g., the processor 120) to control the communication module (e.g., the communication module 190) to transmit at least part of the information corresponding to the pool environment or the information corresponding to the outdoor environment to the external electronic device (e.g., the external electronic device 1600).

According to an embodiment, a method of operating an electronic device 101 may comprise identifying a workout environment of a user of the electronic device 101 as a pool environment based on position information about the electronic device 101 not being obtained by a position measurement module (e.g., a GNSS module) of the electronic device 101 and providing, through a display (e.g., the display device 160) of the electronic device 101, at least part of information corresponding to the pool environment based on sensing data obtained via at least one sensor (e.g., at least one sensor of the sensor module 176) of the electronic device 101, obtaining the position information about the electronic device 101 by the position measurement module (e.g., a GNSS module), identifying the workout environment as the pool environment based on the position information about the electronic device 101 corresponding to a recursive pattern, and providing, through the display (e.g., the display device 160), at least part of the information corresponding to the pool environment, and obtaining the position information about the electronic device 101 by the position measurement module (e.g., a GNSS module), identifying the workout environment as an outdoor environment based on the position information about the electronic device 101 not corresponding to the recursive pattern, and providing, through the display (e.g., the display device 160), at least part of information corresponding to the outdoor environment based on the sensing data and the position information about the electronic device 101.

According to an embodiment, the method may further comprise identifying whether the position information about the electronic device 101 corresponds to the recursive pattern based on whether a plurality of pieces of position information of the electronic device 101 obtained during a designated time meet a designated condition. According to an embodiment, the method may further comprise identifying whether a progress direction turn event indicating a change in a progress direction of a user wearing the electronic device 101 is detected based on the sensing data obtained via the at least one sensor (e.g., at least one sensor of the sensor module 176).

According to an embodiment, identifying whether the progress direction turn event is detected may include detecting the progress direction turn event based on at least one of detection of a rotation of the electronic device 101 to a designated direction based on the sensing data or detection of an acceleration greater than or equal to a threshold acceleration based on the sensing data.

According to an embodiment, the method may further comprise identifying the workout environment as the pool environment based on the detected progress direction turn event.

According to an embodiment, the method may further comprise identifying at least one of a time taken to swim along an interval of a swimming pool corresponding to the pool environment or a total workout distance of the user based on the progress direction turn event and an additional progress direction turn event detected after the progress direction turn event. The information corresponding to the pool environment may include at least one of the time taken to swim along the interval of swimming pool or the total workout distance.

According to an embodiment, the method may further comprise sensing a pressure around the electronic device 101 using a pressure sensor of the electronic device 101 and determining that the user starts a workout based on detecting a pressure change with a designated feature using the pressure sensor.

According to an embodiment, the method may further comprise transmitting at least part of the information corresponding to the pool environment or the information corresponding to the outdoor environment to an external electronic device.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, there may be provided an electronic device capable of automatically identifying the workout environment based on position-associated information and providing workout information per workout environment and a method of operating the electronic device. According to various embodiments, there may be provided an electronic device capable of automatically identifying whether a swim starts and a method of operating the electronic device. Therefore, even when the user starts a workout without explicit entry, the electronic device may identify the workout environment and provide workout information fitting the workout environment, thereby providing high-reliability workout information.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An electronic device, comprising:
  a display;
  a position measurement module configured to receive a satellite signal from a satellite and output position information about the electronic device;
  at least one sensor configured to sense at least one of a motion of the electronic device and a posture of the electronic device;
  at least one processor operatively connected with the display, the position measurement module, and the at least one sensor; and
  a memory operatively connected with the at least one processor, wherein the memory stores instructions configured to, when executed, enable the at least one processor to:
  based on the position information about the electronic device not being obtained by the position measurement module, identify, a workout environment of a user of the electronic device as a pool environment, and control the display to display a first screen including at least part of information corresponding to the pool environment based on sensing data obtained via the at least one sensor,
  obtain the position information about the electronic device by the position measurement module,
  based on the obtained position information about the electronic device corresponding to a recursive pattern, identify the workout environment as the pool environment, and control the display to display the first screen,
  based on the obtained position information about the electronic device not corresponding to the recursive pattern, identify the workout environment as an outdoor environment, and control the display to display a second screen including at least part of information corresponding to the outdoor environment based on the sensing data and the obtained position information about the electronic device.

2. The electronic device of claim 1, wherein the instructions are further configured to enable the at least one processor to:
  identify whether the obtained position information about the electronic device corresponds to the recursive pattern based on whether a plurality of pieces of position information of the electronic device obtained during a designated time meet a designated condition.

3. The electronic device of claim 1, wherein the instructions are further configured to enable the at least one processor to:
  identify whether a progress direction turn event indicating a change in a progress direction of a user wearing the electronic device is detected based on the sensing data obtained via the at least one sensor.

4. The electronic device of claim 3, wherein the instructions are further configured to enable the at least one processor to:
  as part of identifying whether the progress direction turn event is detected, detect the progress direction turn event based on at least one of detection of a rotation of the electronic device to a designated direction based on the sensing data or detection of an acceleration greater than or equal to a threshold acceleration based on the sensing data.

5. The electronic device of claim 3, wherein the instructions are further configured to enable the at least one processor to:
  identify the workout environment as the pool environment based on the detected progress direction turn event.

6. The electronic device of claim 3, wherein the instructions are further configured to enable the at least one processor to:
  identify at least one of a time taken to swim along an interval of a swimming pool corresponding to the pool environment or a total workout distance of the user based on the progress direction turn event, and an additional progress direction turn event detected after the progress direction turn event,
  wherein the information corresponding to the pool environment includes at least one of the time taken to swim along the interval of the swimming pool or the total workout distance.

7. The electronic device of claim 6, wherein the instructions are further configured to enable the at least one processor to:
  detect a plurality of strokes and a number of the plurality of strokes based on the sensing data obtained via the at least one sensor between when the progress direction turn event occurs and when the additional progress direction turn event occurs, wherein the information corresponding to the pool environment includes the number of the plurality of strokes in the interval of the swimming pool.

8. The electronic device of claim 7, wherein the instructions are further configured to enable the at least one processor to:
as part of detecting the number of the plurality of strokes, filter the sensing data, divide the filtered sensing data per stroke unit, and detect the number of the plurality of strokes based on a result of the division.

9. The electronic device of claim 1, further comprising a pressure sensor configured to sense a pressure around the electronic device,
wherein the instructions are further configured to enable the at least one processor to:
determine that the user starts a workout based on detecting a pressure change with a designated feature using the pressure sensor.

10. The electronic device of claim 1, wherein the instructions are further configured to enable the at least one processor to:
while controlling the display to display the second screen, control the display to display the second screen including information about a trajectory along which the electronic device moves.

11. The electronic device of claim 10, wherein the instructions are further configured to enable the at least one processor to:
perform smoothing on the obtained position information about the electronic device measured by the position measurement module, and
obtain the information about the trajectory along which the electronic device moves based on the smoothed position information.

12. The electronic device of claim 1, further comprising a communication module configured to communicate with an external electronic device,
wherein the instructions are further configured to enable the at least one processor to:
control the communication module to transmit at least part of the information corresponding to the pool environment or the information corresponding to the outdoor environment to the external electronic device.

13. A method of operating an electronic device, the method comprising:
based on position information about the electronic device not being obtained by a position measurement module of the electronic device, identifying a workout environment of a user of the electronic device as a pool environment, and providing, through a display of the electronic device, at least part of information corresponding to the pool environment based on sensing data obtained via at least one sensor of the electronic device;
obtaining the position information about the electronic device by the position measurement module;
based on the obtained position information about the electronic device corresponding to a recursive pattern, identifying the workout environment as the pool environment, and providing, through the display, at least part of the information corresponding to the pool environment; and
based on the obtained position information about the electronic device not corresponding to the recursive pattern, identifying the workout environment as an outdoor environment, and providing, through the display, at least part of information corresponding to the outdoor environment based on the sensing data and the obtained position information about the electronic device.

14. The method of claim 13, further comprising:
identifying whether the obtained position information about the electronic device corresponds to the recursive pattern based on whether a plurality of pieces of position information of the electronic device obtained during a designated time meet a designated condition.

15. The method of claim 13, further comprising:
identifying whether a progress direction turn event indicating a change in a progress direction of a user wearing the electronic device is detected based on the sensing data obtained via the at least one sensor.

16. The method of claim 15, wherein identifying whether the progress direction turn event is detected comprises:
detecting the progress direction turn event based on at least one of detection of a rotation of the electronic device to a designated direction based on the sensing data or detection of an acceleration greater than or equal to a threshold acceleration based on the sensing data.

17. The method of claim 15, further comprising:
identifying the workout environment as the pool environment based on the detected progress direction turn event.

18. The method of claim 15, further comprising:
identifying at least one of a time taken to swim along an interval of a swimming pool corresponding to the pool environment or a total workout distance of the user based on the progress direction turn event, and an additional progress direction turn event detected after the progress direction turn event,
wherein the information corresponding to the pool environment includes at least one of the time taken to swim along the interval of swimming pool or the total workout distance.

19. The method of claim 13, further comprising:
sensing a pressure around the electronic device using a pressure sensor of the electronic device; and
determining that the user starts a workout based on detecting a pressure change with a designated feature using the pressure sensor.

20. The method of claim 13, further comprising:
transmitting at least part of the information corresponding to the pool environment or the information corresponding to the outdoor environment to an external electronic device.

* * * * *